(12) United States Patent
Treece et al.

(10) Patent No.: US 10,556,388 B2
(45) Date of Patent: Feb. 11, 2020

(54) POLYESTER-BASED TAPE COMPOSITES FOR WOOD REINFORCEMENT

(71) Applicant: Eastman Chemical Company, Kingsport, TN (US)

(72) Inventors: Mark Allan Treece, Jonesborough, TN (US); John Thomas Hofmann, Kingsport, TN (US); Kendrick Casey Halsey, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 489 days.

(21) Appl. No.: 14/693,418

(22) Filed: Apr. 22, 2015

(65) Prior Publication Data

US 2016/0311156 A1    Oct. 27, 2016

(51) Int. Cl.
*B29C 65/00* (2006.01)
*B29C 65/02* (2006.01)
(Continued)

(52) U.S. Cl.
CPC .......... *B29C 66/7487* (2013.01); *B29C 65/02* (2013.01); *B29C 65/8207* (2013.01);
(Continued)

(58) Field of Classification Search
CPC . B32B 21/10; B32B 27/36; B32B 2037/0092; B32B 21/02; B32B 21/14; B32B 2260/021; B32B 2260/046; B32B 2262/0269; B32B 2262/065; B32B 2262/101; B32B 2262/106; B32B 2262/14; B32B 2305/076; B32B 2307/406; B32B 2317/16; B32B 2367/00; B32B 5/08;
(Continued)

(56) References Cited

U.S. PATENT DOCUMENTS 2,901,466 A    8/1959   Kibler et al.
3,391,056 A    7/1968   Robinson
(Continued)

FOREIGN PATENT DOCUMENTS

DE    103 09 917 A1    9/2004
EP    2 393 866 B1     7/2013
(Continued)

OTHER PUBLICATIONS

Notification of Transmittal of the International Search Report and the Written Opinion of the International Searching Authority, or the Declaration dated Jul. 26, 2016 received in corresponding International Application No. PCT/US16/28760.
(Continued)

*Primary Examiner* — Camie S Thompson
(74) *Attorney, Agent, or Firm* — Tammye L. Taylor

(57) ABSTRACT

The present invention is generally directed to prepreg composites, typically in the form of unidirectional tapes, which contain at least one reinforcing fiber and a thermoplastic polyester matrix. The prepreg composites can be thermally bonded to a wood-containing material in order to improve the structural performance of the material without requiring adhesives. The prepreg composite of the present invention can be applied to a wide range of wood substrates, including various hardwoods, softwoods, and engineered wood composites.

24 Claims, 10 Drawing Sheets

(51) Int. Cl.

| | | |
|---|---|---|
| *B32B 37/18* | (2006.01) | |
| *B29K 67/00* | (2006.01) | |
| *B29C 70/30* | (2006.01) | |
| *B29C 65/82* | (2006.01) | |
| *B32B 21/14* | (2006.01) | |
| *B32B 21/10* | (2006.01) | |
| *B32B 21/02* | (2006.01) | |
| *B32B 5/08* | (2006.01) | |
| *B32B 7/12* | (2006.01) | |
| *B32B 37/00* | (2006.01) | |
| *B29K 311/14* | (2006.01) | |
| *B29K 105/08* | (2006.01) | |

(52) U.S. Cl.
CPC .......... *B29C 66/1122* (2013.01); *B29C 66/45* (2013.01); *B29C 66/472* (2013.01); *B29C 66/721* (2013.01); *B29C 66/7392* (2013.01); *B29C 70/30* (2013.01); *B32B 5/08* (2013.01); *B32B 7/12* (2013.01); *B32B 21/02* (2013.01); *B32B 21/10* (2013.01); *B32B 21/14* (2013.01); *B32B 37/182* (2013.01); *B29C 65/8215* (2013.01); *B29C 66/4722* (2013.01); *B29C 66/71* (2013.01); *B29C 66/72143* (2013.01); *B29C 66/919* (2013.01); *B29C 66/929* (2013.01); *B29K 2067/00* (2013.01); *B29K 2067/003* (2013.01); *B29K 2067/06* (2013.01); *B29K 2105/0872* (2013.01); *B29K 2311/14* (2013.01); *B32B 2037/0092* (2013.01); *B32B 2250/40* (2013.01); *B32B 2260/021* (2013.01); *B32B 2260/046* (2013.01); *B32B 2262/0269* (2013.01); *B32B 2262/065* (2013.01); *B32B 2262/101* (2013.01); *B32B 2262/106* (2013.01); *B32B 2262/14* (2013.01); *B32B 2305/076* (2013.01); *B32B 2307/406* (2013.01); *B32B 2307/542* (2013.01); *B32B 2307/546* (2013.01); *B32B 2309/02* (2013.01); *B32B 2309/12* (2013.01); *B32B 2317/16* (2013.01); *B32B 2367/00* (2013.01); *B32B 2405/00* (2013.01); *B32B 2479/00* (2013.01); *B32B 2605/003* (2013.01); *B32B 2607/00* (2013.01)

(58) Field of Classification Search
CPC .............. B32B 37/182; B32B 2479/00; B32B 2607/00; C09J 2400/263; Y10T 442/20; B29K 2067/00; B29K 2067/06; B29K 2105/0872; B29K 2311/14; B29C 66/7487; B29C 66/71; B29C 66/45; B29C 66/7392; B29C 66/721; B29C 66/72143
USPC ............. 428/114, 535, 537.1, 299.4; 442/59; 528/272
See application file for complete search history.

(56) References Cited

U.S. PATENT DOCUMENTS

| | | |
|---|---|---|
| 4,156,774 A | 5/1979 | Buxbaum |
| 4,263,364 A | 4/1981 | Seymour et al. |
| 4,533,589 A | 8/1985 | Sewell |
| 4,539,390 A | 9/1985 | Jackson, Jr. et al. |
| 4,549,920 A | 10/1985 | Cogswell et al. |
| 4,559,262 A | 12/1985 | Cogswell et al. |
| 5,021,495 A | 6/1991 | Minnick |
| 5,026,593 A | 6/1991 | O'Brien |
| 5,094,883 A | 3/1992 | Muzzy et al. |
| 5,286,545 A | 2/1994 | Simmons, Jr. |
| 5,362,545 A | 11/1994 | Tingley |
| 5,484,882 A * | 1/1996 | Takada .................. C08G 63/08 528/272 |
| 5,609,962 A | 3/1997 | Ouhadi |
| 5,633,340 A | 5/1997 | Hoffman et al. |
| 5,698,061 A | 12/1997 | Maag |
| 6,287,677 B1 | 9/2001 | Ishihara et al. |
| 6,592,962 B2 | 7/2003 | Edwards et al. |
| 6,699,575 B1 | 3/2004 | Dagher et al. |
| 6,709,996 B2 | 3/2004 | Dyksterhouse |
| 7,128,960 B2 | 10/2006 | Walz et al. |
| 7,141,137 B2 | 11/2006 | Fiutak et al. |
| 7,297,740 B2 | 11/2007 | Dyksterhouse |
| 8,378,031 B2 | 2/2013 | Merritt et al. |
| 2001/0002609 A1 | 6/2001 | Dagher et al. |
| 2002/0182955 A1* | 12/2002 | Weglewski ............ C09J 163/00 442/59 |
| 2005/0003147 A1 | 1/2005 | Torrey |
| 2006/0100363 A1* | 5/2006 | Tam ..................... B29C 67/246 524/701 |
| 2010/0068518 A1 | 3/2010 | Honma et al. |
| 2010/0174033 A1 | 7/2010 | Crawford et al. |
| 2010/0204413 A1* | 8/2010 | Powell ................. C09D 167/06 525/418 |
| 2010/0279060 A1* | 11/2010 | Pilpel .................... B29C 70/202 428/113 |
| 2011/0263758 A1 | 10/2011 | Wu |
| 2011/0294919 A1* | 12/2011 | Merritt ............... C09D 133/068 523/437 |
| 2012/0328849 A1 | 12/2012 | Neill et al. |
| 2014/0316063 A1 | 10/2014 | Hochstetter et al. |

FOREIGN PATENT DOCUMENTS

| | | |
|---|---|---|
| JP | H06 122178 A | 5/1994 |
| WO | WO 97 33749 A1 | 9/1997 |
| WO | WO 01 27200 A1 | 4/2001 |
| WO | WO 2006/053070 A1 | 5/2006 |
| WO | WO 2007 116126 A1 | 10/2007 |
| WO | WO 2011 155065 A1 | 12/2011 |
| WO | WO 2011 156693 A2 | 12/2011 |
| WO | WO 2015 005584 A1 | 1/2015 |

OTHER PUBLICATIONS

ASTM D143; "Small Clear Specimens of Timber"; Apr. 2014.
ASTM D245; "Establishing Structural Grades and Related Allowable Properties for Visually Graded Lumber"; Oct. 2011.
ASTM D790; "Flexural Properties of Unreinforced and Reinforced Plastics and Electrical Insulating Materials"; Apr. 2010.
ASTM D905; "Strength Properties of Adhesive Bonds in Shear by Compression Loading"; Oct. 2013.
ASTM D1037; "Evaluating Properties of Wood-Base Fiber and Particle Panel Materials"; May 2012.
ASTM D3043; "Structural Panels in Flexure"; Nov. 2011.
ASTM D3418; "Transition Temperatures and Enthalpies of Fusion and Crystallization of Polymers by Differential Scanning Calorimetry"; May 2015.
ASTM D3500; "Structural Panels in Tension"; Oct. 2014.
ASTM D4761; "Mechanical Properties of Lumber and Wood-Base Structural Material"; Apr. 2013.
Brady, Richard L.; "Interfacial studies in fiber-reinforced thermoplastic-matric composites/"; Doctoral Dissertations 1896—Feb. 2014; Jan. 1989; 745; 127 pages.

* cited by examiner

POLYESTER-BASED TAPE COMPOSITES FOR WOOD REINFORCEMENT

BACKGROUND

1. Field of the Invention

The present invention is generally related to prepreg composites comprising a thermoplastic polymer and the application of such composites onto wood-containing substrates. More particularly, the present invention is generally related to unidirectional tapes comprising a thermoplastic polyester and the application of such tapes onto wood-containing materials.

2. Description of the Related Art

Composite materials have been used in the past to reinforce wood materials in various applications. Generally, these composites can contain reinforcing fibers, such as glass or carbon, which have been used to increase the strength, ductility, and stiffness of the wood materials. Such composites are capable of enhancing strength-to-weight ratios or stiffness in the wood materials, thereby enabling longer spans, smaller deflections under load, and less sag of wood.

Alternatively, metallic reinforcements, such as aluminum plates and strand cables, have also been utilized to improve the strength and stiffness of wood materials. However, these metallic materials have not been widely successful due to their relatively poor adherence to the wood substrate, the need for expensive adhesives for their application, and the mismatch in coefficient of thermal expansion between metals and woods.

Recently, particular focus has been placed on fiber-reinforced polymers ("FRP") as a means to reinforce wood substrates. The FRPs are generally produced by impregnating reinforcing fibers with a thermoset polymer matrix. Thermoset FRPs have been utilized in various applications to reinforce wood materials since they can effectively bond to various wood substrates with the use of an adhesive and are capable of adding strength to the wood materials. Typical adhesives used for bonding FRPs to wood include epoxy resins, phenol resorcinol, formaldehyde resorcinol, melamine or cross-linked melamine, poly(vinyl acetate) ("PVA") or cross-linked PVA, isocyanate, polyurethane, and urea-based adhesives.

While thermoset FRPs are useful in producing reinforced wood materials exhibiting enhanced strength, they do exhibit a number of deficiencies. First, the process to produce thermoset-based FRPs is very slow and can fail to meet the production needs of lumber manufacturers and distributors. A second disadvantage with thermoset FRPs is that they lack dimensional flexibility and must be prepared to specific dimensions before application. Another disadvantage with thermoset FRPs is that they require the use of adhesives to bond them onto the wood substrates, which adds costs and manufacturing complexity to produce the reinforced material. In many cases, the adhesive requires the wood and FRPs to be mechanically primed beforehand to ensure proper bonding. Consequently, this also adds to the manufacturing complexity and timeline.

Accordingly, there is a need for a wood reinforcement system for producing reinforced wood materials that can address the deficiencies of existing systems.

SUMMARY

One or more embodiments of the present invention concern a reinforced wood-containing material comprising a prepreg composite bonded onto a selected surface of the reinforced wood-containing material. The prepreg composite comprises at least one thermoplastic polyester and at least one reinforcing fiber. The thermoplastic polyester has a melt phase viscosity in the range of $10^3$ to $10^7$ Pa-s at 30 to 250° C. Generally, the prepreg composite can comprise a unidirectional tape.

One or more embodiments of the present invention concern a method for preparing a reinforced wood-containing material. The method generally comprises applying a prepreg composite directly onto a selected surface of a wood-containing material to thereby form the reinforced wood-containing material. The applying forms a direct bond between the prepreg composite and the selected surface, wherein the bond has a block shear strength of at least about 2 N/mm$^2$ as measured according to ASTM D905. The prepreg composite comprises at least one thermoplastic polyester and at least one reinforcing fiber. The thermoplastic polyester has a melt phase viscosity in the range of $10^3$ to $10^7$ Pa-s at 30 to 250° C. Generally, the prepreg composite can comprise a unidirectional tape.

One or more embodiments of the present invention concern a prepreg composite comprising at least one thermoplastic polyester and at least one reinforcing fiber. The thermoplastic polyester comprises a dicarboxylic acid component and a diol component. Generally, the diol component comprises diethylene glycol, 2,2,4,4-tetramethyl-1,3-cyclobutanediol ("TMCD"), 1,4-cyclohexanedimethanol ("CHDM"), neopentyl glycol, or a combination of two or more thereof. However, in embodiments when the diol component comprises CHDM, the CHDM makes up at least 40 mole percent of the diol component. Furthermore, the thermoplastic polyester has a melt phase viscosity in the range of $10^3$ to $10^7$ Pa-s at 30 to 250° C. Generally, the prepreg composite can comprise a unidirectional tape.

BRIEF DESCRIPTION OF THE FIGURES

Embodiments of the present invention are described herein with reference to the following drawing figures, wherein.

DETAILED DESCRIPTION

Figure 1:
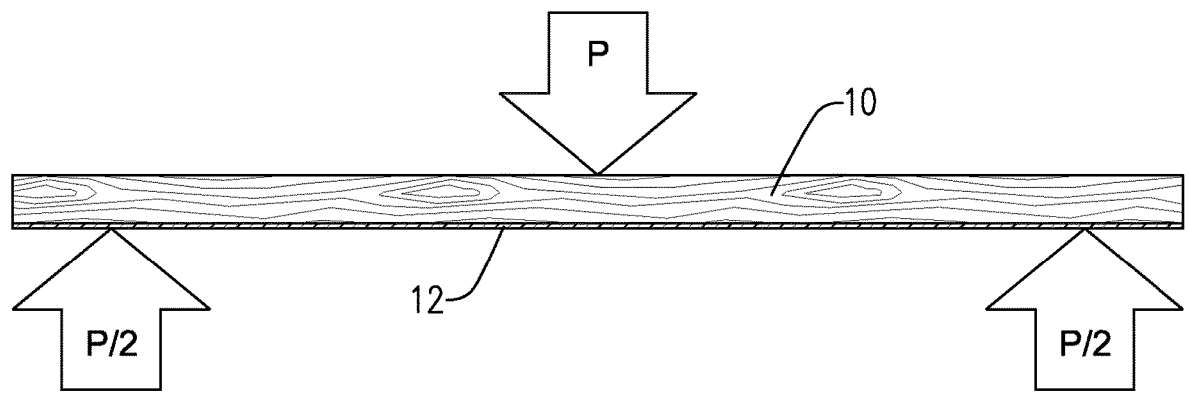
FIG. 1 depicts a schematic of the flexural strength measurement based on ASTM D790.

The present invention is generally related to prepreg composites, such as unidirectional tapes, long fiber tapes ("LFT"), and short fiber tapes ("SFT"), which can be thermally bonded to wood-containing materials in order to enhance various performance properties of the wood material. As discussed herein, the prepreg composites generally comprise a thermoplastic polyester that allows the composite to be thermally bonded to the wood-containing substrate without the need for adhesives. By eliminating the need for adhesives in bonding the prepreg composites to the wood-containing materials, this can simplify the application process and mitigate costs in producing reinforced wood-containing materials. Consequently, the prepreg composites described herein can offer compelling value for reinforcing wood in markets such as building and construction, transportation, durable products, or others where wood or wood-containing material is a preferred material. Furthermore, the use of the prepreg composite described herein can reduce the need for additional wood layers to be applied in certain applications, thereby enabling the use of less wood and yielding lightweight reinforcement materials due to the absence of additional wood.

The Prepreg Composite

As used herein, a "prepreg" refers to a composite comprising at least one reinforcing fiber impregnated with a resin matrix formed from at least one thermoplastic polymer. The prepreg composite can be in the form of a tape, plate, or panel. In certain embodiments, the prepreg composite comprises a unidirectional tape wherein the reinforcing fibers are unidirectionally aligned. Consequently, due to their specific alignment, the reinforcing fibers in the tapes can be arranged parallel, perpendicular, or at an angle (e.g., 30°, 45°, or 60°) to the wood grain or chip alignment when thermally bonded onto the wood substrate.

In various embodiments, the prepreg composite can comprise at least 5, 10, 15, 20, 25, 30, 35, 40 and/or not more than 85, 80, 75, 70, or 65 weight percent of at least one reinforcing fiber. For example, the prepreg composite can comprise in the range of 5 to 85, 10 to 80, 20 to 75, 25 to 70, 30 to 70, 35 to 65, 40 to 80, or 40 to 65 weight percent of at least one reinforcing fiber.

The reinforcing fiber can include, for example, glass, carbon, flax, basalt, comingled fibers, aramid, or a combination of two or more thereof. Suitable glass fibers can include, for example, S-glass, E-glass, or R-glass.

In various embodiments, the thermoplastic polymer in the prepreg composites comprises a thermoplastic polyester. The thermoplastic polyesters can be prepared using melt phase or solid state polycondensation procedures that are known in the art. Examples of these processes are described in U.S. Pat. Nos. 2,901,466, 4,539,390, and 5,633,340, the disclosures of which are incorporated herein by reference in their entireties.

In one or more embodiments, the prepreg composite can comprise at least 1, 2, 5, 10, 15, 20, or 30 and/or not more than 95, 80, 75, 70, 65, 55, or 40 weight percent of at least one thermoplastic polyester. For example, the prepreg composite can comprise in the range of 1 to 95, 2 to 80, 5 to 75, 10 to 70, 15 to 65, 20 to 55, or 30 to 40 weight percent of at least one thermoplastic polyester.

It should be noted that "thermoplastic" polymers are different from "thermosetting" polymers. "Thermosetting" polymers, also known as "unsaturated" polymers, are generally materials that are cured or harden into a given shape through the application of heat, which can form various crosslinks within the material. The hardened or cured thermosetting materials will not generally remelt and regain the processability that they had prior to being hardened or cured. In contrast, "thermoplastic" polymers soften (i.e., become pliable) when heated, but do not cure or set. A thermoplastic often begins in pellet form and becomes softer and more fluid as heat increases. This fluidity allows these materials to be applied using a different array of methods. Furthermore, due to the absence of chemical curing, the changes in the thermoplastic are generally physical and, with the reapplication of heat, partially or wholly reversible. A thermoplastic polymer can typically be reprocessed many times, which is a major reason why thermoplastic-based composite prepregs are compelling for a number of markets and applications. The thermoplastic polyesters utilized in the present invention can provide many benefits over conventional thermoset polymers including, for example, faster fabrication (i.e., reduced cycle time), increased recyclability, better formability, and improved mechanical properties.

In certain embodiments, the thermoplastic polyester can have a melt phase, zero-shear viscosity in the range of $10^3$ to $10^7$ Pa-s at 30 to 250° C. or $10^3$ to $10^6$ Pa-s at 30 to 250° C. Additionally, in various embodiments, the thermoplastic polyester can have an inherent viscosity of at least 0.25, 0.30, 0.35, 0.40, 0.45, 0.50, 0.55, 0.60, 0.65, 0.70, 0.75, 0.80, 0.85, 0.90, or 0.95 dL/g. Additionally or alternatively, the thermoplastic polyester can have an inherent viscosity of not more than 1.2, 1.1, 1.0, 0.9, 0.8, or 0.7 dL/g. In one or more embodiments, the thermoplastic polyester can have an inherent viscosity in the range of 0.25 to 1.2, 0.3 to 1.0, 0.35 to 0.8, or 0.4 to 0.7 dL/g.

Depending on the desired application, the thermoplastic polyester can comprise an amorphous polyester, a semi-crystalline polyester, or a crystalline polyester. Additionally, in various embodiments, the thermoplastic polyester can have a glass transition temperature ("Tg") of at least 25, 50, 60, 75, 90, 100, or 125° C., but not exceeding 150, 200, 225, or 250° C. For example, the thermoplastic polyester can have a Tg in the range of 25 to 250° C., 25 to 225° C., 50 to 200° C., or 50 to 150° C. Furthermore, in embodiments where the thermoplastic polyester is a crystalline polyester, the thermoplastic polyester can have a melting temperature ("Tm") of at least 50, 75, 100, 125, 150, 175, or 200° C., but not exceeding 150, 200, 225, or 250° C. For example, the thermoplastic polyester can have a Tm in the range of 25 to 250° C., 25 to 225° C., 50 to 200° C., or 50 to 150° C. In certain embodiments, the thermoplastic polyester includes polyesters that are initially amorphous in the prepreg composite, but become at least partially crystallized after being thermally bonded onto the wood-containing material.

As would be appreciated in the art, the thermoplastic polyester useful for the prepreg composite comprises an acid component and a diol component.

The acid component of the thermoplastic polyester can comprise various types of acids. In various embodiments, the acid component comprises aromatic dicarboxylic acids having 8 to 14 carbon atoms, aliphatic dicarboxylic acids having 4 to 12 carbon atoms, cycloaliphatic dicarboxylic acids having 8 to 12 carbon atoms, or a combination of two or more thereof. In one or more embodiments, the acid component comprises terephthalic acid, isophthalic acid, 1,4-cyclohexane dicarboxylic acid ("CHDA"), naphthalenedicarboxylic acid, stilbenedicarboxylic acid, cyclohexanediacetic acid, diphenyl-4,4'-dicarboxylic acid, succinic acid, glutaric acid, adipic acid, azelaic acid, sebacic acid, or a combination of two or more thereof.

In one or more embodiments, the acid component comprises at least 10, 25, 50, 75, 90, 95, or 99 mole percent of terephthalic acid, isophthalic acid, CHDA, naphthalenedicarboxylic acid, stilbenedicarboxylic acid, or a combination of two or more thereof. As one skilled in the art would readily appreciate, all component percentages recited herein for the acid component and the diol component are based on the mole percentage for each acid or diol in the respective component and the total mole percentage of the combined additives in the components cannot exceed 100 mole percent. In certain embodiments, the acid component comprises 100 mole percent of terephthalic acid, isophthalic acid, CHDA, naphthalenedicarboxylic acid, stilbenedicarboxylic acid, or a combination of two or more thereof.

In one or more embodiments, the acid component comprises at least 10, 25, 50, 75, 90, 95, or 99 mole percent of terephthalic acid, isophthalic acid, CHDA, or a combination of two or more thereof. In certain embodiments, the acid component comprises 100 mole percent of terephthalic acid, isophthalic acid, CHDA, or a combination of two or more thereof.

In one or more embodiments, the acid component comprises at least 10, 25, 50, 75, 90, 95, or 99 mole percent of terephthalic acid, isophthalic acid, or a combination thereof. In certain embodiments, the acid component comprises 100 mole percent of terephthalic acid, isophthalic acid, or a combination thereof. Furthermore, in certain embodiments, the acid component is comprised entirely of terephthalic acid and/or isophthalic acid. Moreover, in certain embodiments, the acid component is comprised entirely of terephthalic acid. Alternatively, in certain embodiments, the acid component is comprised entirely of isophthalic acid.

In one or more embodiments, the acid component comprises 100 mole percent CHDA.

The diol component of the thermoplastic polyester can comprise various types of diols. In various embodiments, the diol component comprises 2,2,4,4-tetramethyl-1,3-cyclobutanediol ("TMCD"), 1,4-cyclohexanedimethanol ("CHDM"), ethylene glycol, diethylene glycol, 1,2-propanediol, 1,3-propanediol, neopentyl glycol, 1,4-butanediol, 1,5-pentanediol, 1,6-hexanediol, or p-xylene glycol, or a combination of two or more thereof.

In one or more embodiments, the diol component comprises at least 1, 5, 10, 15, 20, 25, 30, or 40 and/or not more than 99, 90, 75, 65, 55, or 50 mole percent of TMCD, CHDM, ethylene glycol, diethylene glycol, or a combination of two or more thereof. For example, the diol component can comprise in the range of 1 to 99, 5 to 90, 10 to 75, 15 to 75, 25 to 75, 30 to 75, 40 to 75, 1 to 55, 5 to 55, 1 to 50, or 5 to 50 mole percent of TMCD, CHDM, ethylene glycol, diethylene glycol, or a combination of two or more thereof.

In one or more embodiments, the diol component comprises less than 60, 50, 40, 30, 20, 10, 5, or 1 mole percent of ethylene glycol. Additionally or alternatively, the diol component comprises at least 0.5, 1, 2, 5, or 10 mole percent of ethylene glycol. In certain embodiments, the diol component can comprise in the range of 0.5 to 50, 0.5 to 40, 1 to 30, or 1 to 20 mole percent of ethylene glycol.

In one or more embodiments, the diol component comprises TMCD and CHDM. For example, the diol component can comprise at least 1, 5, 10, 15, 20, 25, 30, or 40 and/or not more than 99, 90, 75, 65, 55, or 50 mole percent of TMCD and CHDM. Generally, in various embodiments, the diol component can comprise in the range of 1 to 99, 5 to 99, 5 to 90, 10 to 75, 15 to 65, 20 to 55, 25 to 55, 30 to 50, or 40 to 99 mole percent of TMCD and CHDM.

In one or more embodiments, the diol component comprises CHDM. For example, the diol component can comprise at least 5, 25, 35, 40, 45, 50, or 60 and/or not more than 99, 90, 85, 80, 75, or 70 mole percent of CHDM. Generally, in various embodiments, the diol component can comprise in the range of 5 to 99, 25 to 90, 35 to 85, 40 to 80, 45 to 75, 50 to 75, 50 to 70, or 60 to 99 mole percent of CHDM. Alternatively, in certain embodiments, the diol component can comprise at least 40, 45, 50, 55, 60, 65, 70, 75, 80, 85, 90, 95, or 99 mole percent of CHDM.

In one or more embodiments, the diol component comprises TMCD. For example, the diol component can comprise at least 5, 25, 35, 40, 45, 50, or 60 and/or not more than 99, 90, 85, 80, 75, or 70 mole percent of TMCD. Generally, in various embodiments, the diol component can comprise in the range of 5 to 99, 25 to 90, 35 to 85, 40 to 80, 45 to 75, 50 to 75, 50 to 70, or 60 to 99 mole percent of TMCD. Alternatively, in certain embodiments, the diol component can comprise at least 40, 45, 50, 55, 60, 65, 70, 75, 80, 85, 90, 95, or 99 mole percent of TMCD.

In one or more embodiments, the diol component comprises diethylene glycol. For example, the diol component can comprise at least 1, 5, 10, 20, or 30 and/or not more than 95, 80, 70, 60, or 45 mole percent of diethylene glycol. Generally, in various embodiments, the diol component can comprise in the range of 1 to 95, 5 to 80, 10 to 70, 20 to 60, or 30 to 45 mole percent of diethylene glycol.

In addition to the reinforcing fibers and the thermoplastic polyester, the prepreg composite can comprise less than 10, 5, 2, or 1 weight percent of one or more additives. Additives can include, for example, antioxidants, denesting agents, impact modifiers, antiblocking agents, metal deactivators, colorants, phosphate stabilizers, mold release agents, fillers such as talc and formica, silica, glass beads, nucleating agents, ultraviolet light and heat stabilizers, lubricants, flame retardants, or a combination of two or more thereof.

Alternatively, in certain embodiments, the prepreg composite can contain no additives.

The prepreg composite can be formed using methods known in the art, which can include, for example, a pultrusion-type process. Such production methods are further described in U.S. Pat. Nos. 4,549,920, 4,559,262, 5,094,883, 6,709,995, and 7,297,740, the contents of which are incorporated herein by reference in their entireties.

Methods of Applying the Prepreg Composite

The prepreg composite can be directly applied onto a selected surface of a wood-containing material to thereby form the reinforced wood-containing material. As used herein, "directly applied" means that no adhesive is present between the selected surface of the wood-containing material and the prepreg composite. An "adhesive," as used herein, refers to adhesives typically used to apply prepreg composites onto substrates including, for example, epoxy resins, phenol resorcinol, formaldehyde resorcinol, melamine or cross-linked melamine, PVA or cross-linked PVA, isocyanate, polyurethane, and urea-based adhesives. However, as discussed further below, this exclusion of adhesives does not exclude the presence of thermoplastic resin layers between the selected surface of the wood-containing material and the prepreg composite. These thermoplastic resin layers are described later in greater detail.

The selected surface on which to apply the prepreg composite can be an internal surface or an external surface of the wood-containing material. For example, the internal surface of the wood-containing material can be, for example, a middle layer of a multilayered wood composite. In such embodiments, the prepreg composite can function as both a reinforcing agent and a glue-line layer. Alternatively, the selected surface on which to apply the prepreg composite can comprise an external surface of the wood-containing material. The external surface can be, for example, the outside surface of the wood-containing material.

Generally, the prepreg composite can be thermally bonded onto the selected surface of the wood-containing material in a process that involves applied heat and pressure for a certain amount of time. In various embodiments, the prepreg composite can be applied onto the wood-containing material by heating the prepreg composite to form a heated prepreg composite and then contacting the heated prepreg composite with the selected surface of the wood-containing material. Alternatively, in various embodiments, the prepreg composite can be applied onto the wood-containing material by heating the selected surface of the wood-containing material and then contacting the prepreg composite with the heated surface. In other alternative embodiments, both the prepreg composite and selected surface of the wood-containing material can be heated prior to contacting the composite and wood surface.

In one or more embodiments, the heating and contacting steps can occur simultaneously. Alternatively, in certain embodiments, the prepreg composite and selected surface of the wood-containing material can first be contacted with each other and then heated in order to apply the prepreg composite onto the selected surface.

Generally, in such embodiments, the prepreg composite and/or selected surface of the wood-containing material can be heated to temperatures in the range of 30 to 250° C. In one or more embodiments, the heating occurs at temperatures of at least 30, 50, 75, 100, or 150° C. and/or not more than 250, 225, 215, 205, 195, or 185° C. Similarly, the heating can occur at temperatures in the range of 30 to 250° C., 30 to 225° C., 50 to 215° C., 75 to 205° C., 100 to 195° C., or 150 to 250° C. Ideally, the temperature during the application process should be kept at temperatures below 250° C. because wood can begin to degrade at temperatures exceeding 250° C.

It should be noted that the heat can come from conductive heating, convective heating, infrared heating, and/or heating derived from radio frequencies.

Additionally, in various embodiments, the melting temperatures (Tm) and the glass transition temperatures (Tg) of the polyester can determine the most appropriate temperatures needed to bond the prepreg composite to the material substrate.

In embodiments where the polyester is an amorphous polyester, the bonding temperatures should occur at temperatures ranging from the glass transition temperature of the polyester up to 250° C. For example, the bonding for amorphous polyesters can occur in the range of Tg+25° C., Tg+50° C., or Tg+75° C., as long as these ranges are under 250° C.

In embodiments where the thermoplastic polyester is a crystalline polyester or a semi-crystalline polyester, the bonding temperatures occur at temperatures exceeding the melting temperatures of the polyester, but still at a temperature not exceeding 250° C. For example, the bonding for crystalline polyesters can occur in the range of Tm+25° C., Tm+50° C., or Tm+75° C., as long as these ranges are under 250° C.

It should be noted that the above heating temperatures refer to the temperatures that the polyester component in the prepreg composite reaches during the heating process and does not refer to the temperatures of the application apparatuses. Thus, the apparatuses used to apply the heat and bond the prepreg composite to the wood-containing material can operate at temperatures higher than those indicated above in order to provide the necessary thermal energy to the prepreg composite. Such application apparatuses can include, for example, a hydraulic press, a static press, a roll laminator, a double belt laminator, infrared lamps, press platens, or a high pressure chamber.

The contacting step between the prepreg composite and the selected surface of the wood-containing material can occur at pressures of at least 0.25, 0.30, 0.35, 0.50, 0.75, or 1.0 and/or not more than 5.0, 4.0, 3.0, 2.5, 2.0, or 1.75 MPa. For example, the contacting step can occur at pressures in the range of 0.25 to 5.0 MPa, 0.30 to 4.0 MPa, 0.35 to 3.0 MPa, 0.50 to 2.5 MPa, 0.75 to 2.0 MPa, or 1.0 to 1.75 MPa. This pressure can be supplied, for example, by a hydraulic press, static press, roll laminator, or high pressure chamber. Generally, higher pressures are less preferred as they can damage the pore structure of the wood and prevent the thermoplastic polyester from penetrating more deeply into the wood matrix.

In certain embodiments, the pressure can be applied after the initial contact between the prepreg composite and the selected surface of the wood-containing material.

The above heating and pressure steps can occur for at least 1, 2, 3, 4, 5, 6, 7, 8, 9, or 10 minutes and/or not more than 200, 100, 50, 45, 30, 20, or 15 minutes. For example, the heating step and/or pressure step can occur over a time period in the range of 1 to 200 minutes, 2 to 100 minutes, 3 to 45 minutes, 5 to 30 minutes, 6 to 20 minutes, or 7 to 15 minutes. In such embodiments, the pressure utilized for the contacting step during these longer residence times can be in the range of 0.25 to 5.0 MPa, 0.30 to 4.0 MPa, 0.35 to 3.0 MPa, 0.50 to 2.5 MPa, 0.75 to 2.0 MPa, or 1.0 to 1.75 MPa. It should be noted that these ranges refer to the amount of time that the prepreg composite is at the desired temperature and pressure.

Alternatively, the heating step and/or pressure step can occur over a very short period of time when continuous press technology, such as roll presses, double belt press laminators, and other continuous style equipment, is utilized. For example, the above heating and pressure steps can occur for at least 0.01, 0.05, 0.1, or 0.5 and/or not more than 25, 20, 10, or 5 seconds. More particularly, the above heating and pressure steps can occur over a time period in the range of 0.01 to 25, 0.05 to 20, 0.1 to 10, 0.01 to 10, 0.1 to 10, or 0.5 to 5 seconds. In such embodiments, higher pressures may be utilized during these shorter residence times to facilitate the bonding between the prepreg composite and the wood-containing material. For example, the pressure utilized for the contacting step during these shorter residence times can be in the range of 2 to 12 MPa, 2.5 to 11 MPa, 3 to 10 MPa, 3.5 to 9.5 MPa, 3.5 to 9 MPa, or 4 to 8.5 MPa.

As noted above, in various embodiments, no adhesive is present or used between the prepreg composite and the selected surface of the reinforced wood-containing material. Once applied, the prepreg composite can form a direct bond with the selected surface of the wood-containing material. For example, the formed bond between the prepreg composite and the selected surface of the wood-containing material can have an adhesion strength of at least 0.5, 1, 2, 3, 4, 5, 6, 7, 8, 9, or 10 and/or not more than 100, 80, or 50 N/mm² as measured according to ASTM D905. Furthermore, in various embodiments, the formed bond between the prepreg composite and the selected surface of the wood-containing material can have an adhesion strength in the range of 0.5 to 100, 1 to 100, 2 to 80, 3 to 80, 4 to 80, 5 to 80, 6 to 80, 9 to 50, or 10 to 50 N/mm² as measured according to ASTM D905.

Although not wishing to be bound by theory, the thermoplastic polyester used in the prepreg composite is considered essential for forming the bond between the prepreg composite and the selected surface of the wood-containing material. For example, a neat film produced entirely from the thermoplastic polyester used in the prepreg composite can be capable of forming a bond on the selected surface of the wood-containing material that has an adhesion strength of at least 0.5, 1, 2, 3, 4, 5, 6, 7, 8, 9, or 10 and/or not more than 100, 80, or 50 N/mm² as measured according to ASTM D905. Furthermore, in various embodiments, a film produced entirely from the thermoplastic polyester used in the prepreg composite can be capable of forming a bond on the selected surface of the wood-containing material that has an adhesion strength in the range of 0.5 to 100, 1 to 100, 2 to 80, 3 to 80, 4 to 80, 5 to 80, 6 to 80, 9 to 50, or 10 to 50 N/mm² as measured according to ASTM D905. As used herein, a "neat film" comprises a film formed entirely from the thermoplastic polyester.

The resulting reinforced material comprising the prepreg composite bonded onto the selected surface can comprise a plurality of layers formed from the prepreg composite. In such embodiments, the plurality of layers can be formed from applying one or more prepreg composites on top of each other. For example, the resulting reinforced material can comprise at least 2, 3, 4, 5, 7, 8, 9, or 10 layers formed from a separate prepreg composite. Each of the layers formed from the prepreg composite can have a thickness in the range of 1 to 2,000, 10 to 1,500, 25 to 1,000, 40 to 900, 50 to 800, 75 to 700, 100 to 600, or 150 to 500 microns. In certain embodiments, the plurality of layers can be applied to one another prior to being bonded onto the selected surface of the wood-containing material. For example, two or more prepreg composites can be laminated together to form a multilayered composite, which can then be thermally bonded onto the wood-containing material. Alternatively, in certain embodiments, a plurality of separate prepreg composites may be simultaneously bonded onto the selected surface of the wood-containing material at one time.

In various embodiments, the wood-containing material can comprise, consist essentially of, or consist of wood. Generally, the wood-containing material can comprise at least 10, 25, 50, 75, 90, or 99 weight percent of wood. Furthermore, in certain embodiments, the wood-containing material is formed entirely from a wood or wood composite.

The wood can comprise hardwoods, softwoods, and/or engineered wood composites. Hardwoods can include, for example, oak, poplar, maple, walnut, apitong, keruing, and/or hickory. Softwoods can include, for example, pine, balsa, cork, bamboo, cottonwood, Douglas fir, and/or birch. Engineered wood composites can include, for example, plywood, oriented-strand board, particle board, cross-engineered lumber, glue laminated timber ("GLT"), Cross Laminated Timber ("CLT"), Laminated Veneer Lumber ("LVL"), Laminated Strand Lumber ("LSL"), I-Joists, I-Beams, and/or fiberboard.

One surprising attribute in regard to the prepreg composite was its ability to thermally bond onto wood-containing materials that contained large amounts of moisture (e.g., greater than 20 weight percent of water). Unlike hot melt adhesive systems that are very sensitive to moisture and require dried wood substrates to effectively adhere, the prepreg composites were able to thermally bond onto the wood-containing materials regardless of its water content. In order to ensure that a proper bond forms between the prepreg composite and the wet wood substrates in such embodiments, pressure may be continuously applied to the bonded prepreg composite and wood substrate after the initial application step until they cool to room temperature. This added pressure after the initial application step can prevent moisture from leaving the wood and weakening the newly-formed bond between the prepreg composite and wood substrate. Additionally, holding the bonded prepreg composite and the wood substrate under pressure until they cool to room temperature can force any excess moisture from the wood substrate back into the wood. Consequently, the ability of the prepreg composite to applied to wet wood materials may mitigate the need for rigorous drying procedures before treatment, thereby decreasing energy costs and production time.

Generally, in various embodiments, the wood-containing material has a moisture content of at least 0.1, 0.5, 1, or 5 and/or less than 30, 20, 15, 10, 5, or 1 weight percent. For example, the wood-containing material can have a moisture content in the range of 0.1 to 30, 0.5 to 20, 0.5 to 10, or 0.5 to 5 weight percent.

Additionally, in certain embodiments, a thermoplastic resin layer can be applied onto the selected surface of the wood-containing material prior to applying the prepreg composite in order to reduce the processing temperature and/or pressure in the formation of the bond between the prepreg composite and wood-containing material. These thermoplastic resin layers can also be used to enhance the strength of the resulting reinforced wood materials. In particular, these thermoplastic resin layers can provide higher amounts of thermoplastic polyester at the wood interface, thereby enabling more polyester to quickly penetrate into the pore structure of the wood. Improving the bond strength can be important for a number of applications where significant hygro-thermal cycling of wood is expected to occur, which may be associated with warping, swelling, and delamination of the prepreg composite. Furthermore, since the resin layer can enable a stronger bond to wood, the use of such layers may reduce the prepreg composite bonding time necessary to obtain the desired strengths and properties in the wood materials. Moreover, when lamination equipment is used to apply the prepreg composite and resin layers, the use of the resin layers may enable the use of lower pressures and/or temperatures during thermal bonding in order to reach the desired bond strength.

It should be noted that these "thermoplastic resin layers" are not adhesives since they can be formed from thermoplastic polymers, including the same thermoplastic polyesters used to produce the prepreg composites. Consequently, the resin layers can be applied to the selected surface of the wood-containing material utilizing the same application methods described above for the prepreg composites. The resulting wood-containing material containing a resin layer applied thereon can be considered a "prereinforced material" on which the prepreg composite can be applied. Alternatively, in certain embodiments, the resin layers may be applied to the surface of the wood-containing material at the same time as the prepreg composite.

In various embodiments, the resin layer can comprise, consist essentially of, or consist of at least one thermoplastic polymer. These thermoplastic polymers can comprise any of the thermoplastic polyesters described above in regard to the prepreg composite. In one or more embodiments, the resin layer can comprise at least 50, 75, 95, or 99 weight percent of one or more thermoplastic polyesters.

In certain embodiments, the resin layer can contain the same thermoplastic polyester as used in the prepreg composite. Alternatively, the resin layer can contain at least one thermoplastic polyester that is not present in the prepreg composite.

The resin layers can comprise one or more additives. The additives can comprise, for example, antioxidants, denesting agents, impact modifiers, antiblocking agents, metal deactivators, colorants, phosphate stabilizers, mold release agents, fillers such as talc and formica, silica, glass beads, glass fibers, nucleating agents, ultraviolet light and heat stabilizers, lubricants, flame retardants, or a combination of two or more thereof.

Generally, in various embodiments, the resin layers can have an average thickness in the range of 10 to 400, 15 to 300, or 20 to 250 microns. In embodiments where the reinforced material contains multiple layers formed from a prepreg composite, a resin layer can be used to separate each of these respective layers formed from the prepreg composites. Thus, the reinforced material would have alternating layers of resin layers and layers formed from the prepreg composite.

The Reinforced Wood Material

Once applied and bonded to the material, the bonded prepreg composite can improve various characteristics of the wood-containing material. For example, the bonded prepreg composite can enhance the strength, stiffness, and ductility of the wood-containing material. In particular, the bonded prepreg composite can provide a strip of high tensile strength material to the wood-containing material.

In one or more embodiments, the reinforced material can have a greater peak flexural strength compared to the untreated wood-containing material. For example, the peak flexural strength according to ASTM D790 of the reinforced material can be at least 1, 5, 10, 20, 50, 100, 150, or 200 percent greater than the peak flexural strength of the initial wood-containing material. In certain embodiments, the reinforced material can have a peak flexural strength as measured according to ASTM D790 of at least 20, 40, 60, 80, 100, 120, 140, 160, 180, or 200 MPa and/or not more than 5,000, 2,500, 2,000, 1,500, 1,250, 1,000, 900, 800, or 500 MPa.

In one or more embodiments, the reinforced material can have a greater modulus of elasticity compared to the untreated wood-containing material. For example, the modulus of elasticity according to ASTM D1037 of the reinforced material can be at least 1, 5, 10, 20, 50, 100, 150, or 200 percent greater than the modulus of elasticity of the initial wood-containing material. It should be noted that the modulus of elasticity can also be measured by similar test methods known in the art, including, but not limited to, ASTM D143, ASTM D3500, ASTM D1037, ASTM D3043, and ASTM D4761. However, while these other ASTM tests may also be used to measure modulus of elasticity, the results from these other test methods are different and are not interchangeable with one another.

In one or more embodiments, the reinforced material can have a greater modulus of rigidity compared to the untreated wood-containing material. For example, the modulus of rigidity according to ASTM D1037 of the reinforced material can be at least 1, 5, 10, 20, 50, 100, 150, or 200 percent greater than the modulus of rigidity of the initial wood-containing material. It should be noted that the modulus of rigidity can also be measured by similar test methods known in the art, including, but not limited to, ASTM D143, ASTM D3500, ASTM D1037, ASTM D3043, and ASTM D4761. However, while these other ASTM tests may also be used to measure modulus of rigidity, the results from these other test methods are different and are not interchangeable with one another.

In one or more embodiments, the reinforced material can have a greater modulus of rupture compared to the untreated wood-containing material. For example, the modulus of rupture according to ASTM D1037 of the reinforced material can be at least 1, 5, 10, 20, 50, 100, 150, or 200 percent greater than the modulus of rupture of the initial wood-containing material. It should be noted that the modulus of rupture can also be measured by similar test methods known in the art, including, but not limited to, ASTM D143, ASTM D3500, ASTM D1037, ASTM D3043, and ASTM D4761. However, while these other ASTM tests may also be used to measure modulus of rupture, the results from these other test methods are different and are not interchangeable with one another.

In one or more embodiments, the reinforced material can have a greater work to maximum load in bending compared to the untreated wood-containing material. For example, the work to maximum load in bending according to ASTM D790 of the reinforced material can be at least 1, 5, 10, 20, 50, 100, 150, or 200 percent greater than the work to maximum load in bending of the initial wood-containing material.

In one or more embodiments, the reinforced material can have a greater compressive strength parallel to the grain of the material compared to the untreated wood-containing material. For example, the compressive strength parallel to the grain of the material according to ASTM D1037 of the reinforced material can be at least 1, 5, 10, 20, 50, 100, 150, or 200 percent greater than the compressive strength parallel to the grain of the material of the initial wood-containing material.

In one or more embodiments, the reinforced material can have a greater compressive strength perpendicular to the grain of the material compared to the untreated wood-containing material. For example, the compressive strength perpendicular to the grain of the material according to ASTM D1037 or ASTM D143 of the reinforced material can be at least 1, 5, 10, 20, 50, 100, 150, or 200 percent greater than the compressive strength perpendicular to the grain of the material of the initial wood-containing material.

In one or more embodiments, the reinforced material can have a greater shear strength parallel to the grain of the material compared to the untreated wood-containing material. For example, the shear strength parallel to the grain of the material according to ASTM D1037 or ASTM D143 of the reinforced material can be at least 1, 5, 10, 20, 50, 100, 150, or 200 percent greater than the shear strength parallel to the grain of the material of the initial wood-containing material.

In one or more embodiments, the reinforced material can have a greater impact performance as measured, for example, by falling ball impact (ASTM D 1037) or impact bending (ASTM D143) compared to the untreated wood-containing material. For example, the impact performance of the reinforced material is at least 1, 5, 10, 20, 50, 100, 150, or 200 percent greater than the impact bending of the initial wood-containing material.

In one or more embodiments, the reinforced material can have a greater fastener holding capability to retain nails, screws, and the like. Such properties can be measured by test methods such as those described in ASTM D1037 for lateral nail resistance, nail withdrawal, or screw withdrawal. For example, the increased fastener holding capability of the reinforced material is at least 1, 5, 10, 20, 50, 100, 150, or 200 percent greater than the fastener holding capability of the initial wood-containing material.

In addition, the bonded prepreg composite may also enhance the water resistance and chemical resistance of the reinforced material, especially since the prepreg composite can be significantly less porous than the material to be reinforced (e.g., wood).

Additionally, the layers formed from the prepreg composites can be semi-transparent and/or exhibit desirable gloss. In embodiments where the prepreg composite is applied to an external surface of the wood-containing material, the external surface upon which the prepreg composite is applied can have a gloss in the range of at least 40, 45, 50, or 55 gloss units and/or not more than 95, 90, 85, or 80 gloss units as measured according to ASTM D 2457. In embodiments where the prepreg composite contains no color additives and is not opaque, the wood grain of the reinforced wood material can still show through to the observer, thereby offering aesthetic advantages in the market.

Due to their improved strength, the reinforced materials produced herein can mitigate the need for additional wood to be used in the applications that utilize the reinforced materials. Consequently, this reduction of wood use can also facilitate lighter weight materials that are desirable in various applications. Moreover, the presence of a thermally bonded prepreg composite on the reinforced material can improve the moisture and chemical resistance of the wood-containing material relative to its untreated state. Thus, this can prolong the lifespan and functionality of the wood-containing material.

The reinforced materials produced with the prepreg composites described herein can be utilized in various applications in the construction industry, transportation industry, or any other industry in which wood materials are utilized. The reinforced materials can be incorporated into various end products including, for example, scaffolding, wall sheathing, Hoist flanges and webs, subroofing materials, concrete form panels, countertops, cabinets, signs, furniture, agricultural bins, industrial tanks, reinforcement panels, automotive flooring, RV panels, railcar flooring, shipping container flooring, ship structures, and nautical structures.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

This invention can be further illustrated by the following examples of embodiments thereof, although it will be understood that these examples are included merely for the purposes of illustration and are not intended to limit the scope of the invention unless otherwise specifically indicated.

EXAMPLES

In the following examples, the flexural strength test described in ASTM D 790 is utilized as the experiment for measuring the improvements in the strength of wood. In this test, a load-deflection curve is generated and the peak load is reported for the neat wood species as well as the wooden block with the prepreg composite thermally bonded thereon. In particular, the flexural strength test is used to quantify the improvement to the peak load that wood can withstand in bending mode, after thermally bonding a prepreg composite onto the wood substrate.

The block shear test is used in the following examples to analyze the strength of the bond between the wood substrate and polymer matrix. The block shear test was useful for assessing which polymer formulations and viscosity ranges were suitable for bonding a polyester-based UDT to wood.

The test samples for the flexural strength test and the block shear test were prepared as follows. Test samples in the following examples were prepared by thermally bonding and laminating the tested sample on the desired wood substrate using a Carver Press (Model No. 3693). The Carver Press was equipped with dual-opening 0.356 m×0.356 m (14"×14") steel platens, independent digital temperature controllers, an applied hydraulic force of up to 267 kN (60,000 lbf), and an integrated water coolant system. The lamination parameters for each test sample included a bonding time of 2 to 10 minutes, a lamination temperature of 115 to 180° C., and a holding pressure of 0.34 to 1.72 MPa (50-250 PSI).

To assist in production of the samples as necessary, a 16-sample fixture composed of 2024 aluminum alloy was fabricated. This two-part fixture enabled consistent control of sample alignment during lamination, resulting in consistent and uniform samples. In all cases, the selected temperature and pressure were employed for the specified time, and then the water coolant system was triggered to rapidly cool the platens and samples while still under pressure.

For the flexural strength analysis of wood reinforced with a UDT, a 3-point bending test method was used as described by ASTM D 790. A schematic illustrating this test method is shown in FIG. 1. For this test, a single block of wood was used with dimensions of 6.35×63.5×240 mm$^3$ (0.25×2.5× 10.0 in$^3$). As shown in FIG. 1, the 240 mm (10.0 in) cut runs parallel to the wood grain and the UDT (12) is bonded to the largest surface area (63.5×240 mm$^2$) of the wood (10) to form a wood reinforced structure. For the flexural strength test, the UDT was directly laminated onto the wood using the Carver Press described previously, with glass fibers running parallel to the wood grain. A layer of DuPont™ Kapton® release film was placed between the UDT and the press platens of the Carver Press in order to prevent the polyester from sticking to the Press. This test also utilized an MTS Insight® 50 kN Model No. 820,050 SLW after proper sample conditioning. Mechanical data was acquired by 3-Point Bending according to ASTM D 790 using a span-to-thickness ratio of 32:1 and a crosshead displacement speed of 1.27 mm/min (0.05 in/min). The samples were positioned so that the UDT was on the bottom, tensile face of the wood sample. It is worth noting that a small, thin piece of rubber tubing was placed around the radius of the upper loading nose, in order to mitigate localized crushing of the wooden substrates. The resulting ultimate flexural strength, $\sigma_{ultimate}$, was calculated according to the following equation, where P is the load at failure, L is the test span (203 mm), b is the sample width (63.5 mm), and d is the sample thickness (6.35 mm+Film or UDT layer):

$$\sigma_{ultimate} = \frac{3PL}{2bd^2}$$

Figure 2:
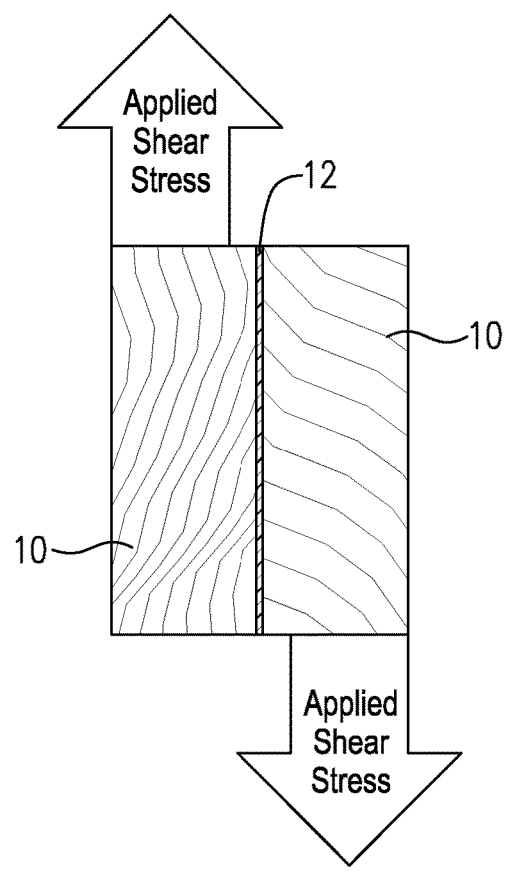
FIG. 2 depicts a schematic of the block shear adhesion test based on ASTM D 905.

As discussed above, adhesion testing was completed using the block shear test method defined by ASTM D 905. A schematic illustrating this test method is shown in FIG. 2. As shown in FIG. 2, the block shear test requires two blocks of wood (10), both with dimensions of 19.05×38.01×50.8 mm³ (0.75×1.50×2.0 in³). In this test method, the 50.8 mm (2.0 in) cut length runs parallel to the wood grain and the polymer film (12) is bonded to the largest surface area (38.01×50.8 mm²) of the wood. Films used in adhesion testing were produced using either a 1.0 or 1.5 inch Killion single screw extruder (25.4 or 38.1 mm, respectively). Films were produced from thermoplastic polymers according to the specific polymer's drying and temperature requirements. Generally, the polymers were processed under melt processing conditions (240 to 280° C.) with variations depending on the polymer's Tg and Tm (if applicable). The films were produced by first drying the polymer pellets at 60 to 150° C. over 4 to 8 hours and then extruding the pellets into films at a temperature ranging from 240 to 280° C. The required processing conditions for each polymer were determined in accordance with the data sheets provided by the polymer's manufacturer. The films produced for the block shear testing had a nominal thickness of 381.0 microns (15 mils) and were cut by hand to fit the block's surface area. Once the two blocks were bonded together using the polymeric film, thereby creating a wood-film-wood or "WFW" structure, a shearing tool attached to an Instron machine was utilized for testing with a set loading rate of 5 mm/min (0.20 in/min). The shearing tool applied a load to the top of the wood using a cross sectional area of 605 mm² (0.94 in²). The resulting data reported in the following examples includes the peak load and peak shear stress as measured in MPa at failure of the adhesive bond. Note that in this particular test, the peak load is measured directly and converted to a stress measurement by dividing the load by the area of the bond, which was measured in every sample but which generally was close to 1930 mm² (3.0 in²) from the block geometry.

The inherent viscosity ("IhV") in the following examples was understood to be the viscosity of a dilute solution of the polymer. As used herein, inherent viscosity is defined as the viscosity of a 60/40 (wt/wt) phenol/tetrachloroethane at a concentration of 0.25 g polyester per 50 ml solution at 25° C. or 30° C. This viscosity measurement is representative of the polymer's molecular weight.

The melting point (Tm) and glass transition (Tg) temperatures in the following examples were determined using a TA Q2000 DSC instrument from TA Instruments at a scan rate of 20° C./min according to ASTM D3418. The sample was heated from 23° C. to 280° C. (20° C./min). After annealing for 2 minutes at 280° C., the sample was quenched at 80° C./minute to room temperature (23° C.) and a second heat melting scan was performed at the same 20° C./min rate. The reported melting point temperature is the peak minimum of the endothermic heat flow curve of the second heat melting scan, whereas the reported glass transition temperature is determined from the midpoint of the enthalpy step change in the scan, prior to the melting temperature.

The zero-shear viscosity ("$\eta_o$") of the polymer matrix or film, where reported in the following examples, was determined by first capturing small amplitude oscillatory shear ("SAOS") rheology data using a Rheometrics RDA II rheometer and performing frequency sweeps over the range of 1 to 400 s⁻¹ at multiple temperatures above the Tg for a given polymer of known composition and IhV. Generally, each sample was tested at two or three temperatures above the Tg of the polymer, which was within a temperature range of 200 to 280° C. For each polymer of a known IhV, at least three frequency sweeps were conducted at different temperatures above the Tg. Once the data was obtained, a Cross model was fit and the terms were modeled as follows:

$$\eta(T, IhV, \dot{\gamma}) = \frac{\eta_0}{1 + (\tau\dot{\gamma})^m}$$

$$\eta_0 = A1(T - 80)^{A2} IhV^{A3}$$

$$\tau = A4(T - 80)^{A5} IhV^{A6}$$

$$m = A7(T - 80)^{A8} IhV^{A9}$$

The fitting terms, A1-A9, were determined by a non-linear regression using the Levenberg-Marquardt method built into MathCad software, and a model was then used to estimate the film zero-shear viscosity at the time of lamination using lamination temperature ("T") and the known polymer inherent viscosity as inputs.

The gloss in the following examples was measured at an angle of 60° using a BYK Gloss Meter (BYK Micro-Gloss) according to the standard test method defined in ASTM D 2457.

Example 1—The Polymer Resins

Table 1, below, depicts a list of the polyester resins used in the examples. All copolyesters depicted in Table 1 are a combination of glycol and acid monomers. Examples P1-P6 all contain 69 mole percent ethylene glycol, 31 mole percent of 1,4-cyclohexanedimethanol ("CHDM"), and 100 mole percent of terephthalic acid ("TPA"). Despite their identical monomer composition, Examples P1-P6 exhibit different inherent viscosities ("IhV") due to polymers having different degrees of polymerization with lower IhV indicating a lower degree of polymerization, while some contain additives such as carbon black colorants (P4), UV resistant additives (P2), and flame retardant additives (P5).

As shown in Table 1, Examples P7-P11 contain varying glycols such as EG, CHDM, diethylene glycol ("DEG"), and tetramethyl-1,3-cyclobutanediol (60 mol % cis isomer) ("TMCD"), as well as acids such as TPA, isophthalic acid ("IPA"), and 1,4-cyclohexane dicarboxylic acid ("CHDA"). Table 1 provides various details for each polymer composition, including the polymer's IhV, glass transition temperature ("Tg"), melting temperature ("Tm"). If the sample was amorphous and contained no measurable Tm, then the sample was marked as "A."

The morphology cases listed in Table 1 attempted to categorize the listed polyesters based on their crystallinity properties. "Case 1" refers to materials that are amorphous and do not crystallize under thermal bonding conditions, thereby allowing these materials to thermally bond at temperatures between their Tg and the temperature limits of the thermal bonding. "Case 2" refers to semicrystalline materials that start as amorphous but can crystallize during thermal bonding, thereby allowing these materials to be bonded between their Tg and the temperature limits of the thermal bonding. "Case 3" refers to highly crystalline materials that need to be subjected to temperatures exceeding their Tm during thermal bonding. The "% Crystallinity" in Table 1 refers to the percent crystallinity in certain samples before and after thermal bonding.

Table 1 also names the features of non-polyester materials which were not shown to display the attributes of the present invention and are marked as comparative examples (labeled "C"). These comparative resins included nylon 6 (Raidolon® S 24E from Radici Group) ("C12"), polycarbonate (Makrolon® 2608 from Bayer Material Science) ("C13"), polypropylene (PPH-10060 from Total) ("C14"), acrylic (Optix® CA-927 HF Clear from Plaskolite West) ("C15"), and polystyrene (CAS #9003-53-6) ("C16").

The glass fiber content of the UDT samples was determined by weighing residual material after ashing. This was completed by measuring the mass of a tape sample using an analytical balance. The sample was then placed within a muffle furnace (Thermolyne 4800 or equivalent) with a

TABLE 1

Polyester Film Materials

| Sample | Glycols | | | | Diacids | | | IhV (dL/g) | Tg (° C.) | Tm (° C.) | % Crystallinity (Before-After Bonding) | Morphology Case | Additive Type |
|---|---|---|---|---|---|---|---|---|---|---|---|---|---|
| | mol % EG | mol % CHDM | mol % TMCD | mol % DEG | mol % TPA | mol % IPA | mol % CHDA | | | | | | |
| P1 | 69 | 31 | 0 | 0 | 100 | 0 | 0 | 0.43 | 75 | A | — | Case 1 | None |
| P2 | 69 | 31 | 0 | 0 | 100 | 0 | 0 | 0.67 | 77 | A | — | Case 1 | UV |
| P3 | 69 | 31 | 0 | 0 | 100 | 0 | 0 | 0.72 | 78 | A | — | Case 1 | None |
| P4 | 69 | 31 | 0 | 0 | 100 | 0 | 0 | 0.55 | 77 | A | — | Case 1 | Black |
| P5 | 69 | 31 | 0 | 0 | 100 | 0 | 0 | 0.54 | 77 | A | — | Case 1 | FR |
| P6 | 69 | 31 | 0 | 0 | 100 | 0 | 0 | 0.58 | 78 | A | — | Case 1 | None |
| P7 | 0 | 100 | 0 | 0 | 50 | 50 | 0 | 0.62 | 81 | A | — | Case 1 | None |
| P8 | 63 | 0 | 0 | 37 | 100 | 0 | 0 | 0.69 | 52 | 169 | 0.0-14.9 | Case 2 | None |
| P9 | 96 | 4 | 0 | 0 | 100 | 0 | 0 | 0.56 | 78 | 243 | 1.0-33.3 | Case 2 | None |
| P10 | 0 | 77 | 23 | 0 | 100 | 0 | 0 | 0.63 | 106 | A | 0.0-14.9 | Case 1 | None |
| P11 | 0 | 100 | 0 | 0 | 0 | 0 | 100 | 0.92 | 67 | 224 | 0.9-27.3 | Case 2 | None |

Non-polyester Film Materials (Comparative Samples)

| Sample | Description | Tg (° C.) | Tm (° C) | % Crystallinity (Before-After Bonding) | Morphology Case | Additive Type |
|---|---|---|---|---|---|---|
| C12 | Nylon 6: Radilon ® S 24E | n/a | 221 | 23.0-27.0 | Case 3 | None |
| C13 | Polycarbonate: Makrolon ® 2608 | 146 | A | — | Case 1 | None |
| C14 | Polypropylene: PPH-10060 | n/a | 165 | 43.0-46.0 | Case 3 | None |
| C15 | Acrylic/PMMA: Optix ® CA-927 HF Clear | 89 | A | — | Case 1 | None |
| C16 | Polystyrene: CAS# 9003-53-6 | 109 | A | — | Case 1 | None |

Example 2—Unidirectional Tapes ("UDT")

Table 2 demonstrates a list of UDT samples that were produced from some of the polymers listed in Table 1. In all the UDT samples, an E-glass was used as the reinforcing fiber. More particularly, UDT samples T1, T2, T4, and T5 contained TufRov® 4588 from PPG Industries, while UDT sample T3 contained TufRov® 4510 from PPG Industries. Table 2 lists the weight fractions of the UDT samples, which in all cases contained 60 weight percent of E-glass reinforcing fibers and 40 weight percent of the polymer resin matrix. Table 2 also provides the thickness of the UDT samples, along with the IhV of the polymer matrices containing the glass fibers. As shown in Table 2, UDT Samples T1-T5 were produced using polyesters P6, P4, P10, and P11 from Table 1. In addition, the morphology case for each of the polyesters used to the UDT samples is provided in Table 2. All UDT samples except T5 contained amorphous polyesters (Case 1).

TABLE 2

| Tape ID # | Polymer Matrix | Polymer IhV (dL/g) | E-Glass Loading (wt %) | Tape Thickness (µm) | Morphology Case |
|---|---|---|---|---|---|
| T1 | P6 | 0.55 | 60 | 150-250 | Case 1 |
| T2 | P4 | 0.45 | 60 | 200-300 | Case 1 |
| T3 | P4 | 0.36 | 60 | 350-450 | Case 1 |
| T4 | P10 | 0.54 | 60 | 350-450 | Case 1 |
| T5 | P11 | 0.67 | 60 | 350-450 | Case 2 | temperature control of 600° C.+/−10° C. for a period of 2 hours. The residual mass of the tape sample after ashing was subsequently measured using an analytical balance. The percent glass fiber content was determined by the ratio of the final to the original sample mass. It is worth noting that a sample of at least 1.5 g was utilized in order to mitigate error.

Example 3—Wood Materials

Table 3 provides the wood species that were included in the development of this invention. Hardwoods such as oak, poplar, and maple were considered along with softwood species such as pine. Engineered wood composites that were evaluated included plywood, medium-density fiberboard ("MDF") and oriented strand board ("OSB"). The flexural strength reported in Table 3 was measured according to the method described above. The modulus of elasticity (MOE), compressive strength parallel to the grain, and internal (glue-line) strength values of each wood species listed in Table 3 were derived from the "Wood handbook: wood as an engineering material," from Forest Products Laboratory (Vol. 72, U.S. Government Printing, 1987), the contents of which are incorporated herein by reference in its entirety.

TABLE 3

| Wood Species | Wood Family | Measured Flex Strength of Wood [MPa] | *Modulus of Elasticity (GPa) | *Compressive Strength (Parallel to Grain) [MPa]* | *Internal (glue-line) Shear Strength (Parallel to Grain) [MPa]* |
|---|---|---|---|---|---|
| Oak | Hardwood | 156 | 11.3-15.7 | 42 | — |
| Pine | Softwood | 107 | 8.5-13.7 | 33 | — |
| Poplar | Hardwood | 134 | 10.9 | 38 | — |
| Maple | Hardwood | 203 | 10-12.6 | 45 | — |
| MDF | Engineered | 49 | 3.2-4.4 | — | 1.1 |
| OSB | Engineered | 11 | 4.4-6.3 | — | 0.4 |
| Plywood | Engineered | 109 | 7.0-8.5 | — | 1.6 |

*Derived from the Wood Handbook

Example 4—Application of UDT Samples to Wood

For this example, the improvement in flexural strength provided by the inventive UDTs was analyzed. In particular, wood samples coated with the inventive UDTs were compared to wood samples without a UDT. The UDTs were laminated onto the wood samples using the Carver Press as described above. Lamination was carried out for about 5 minutes and at a pressure of 1.72 MPa. The temperature and corresponding zero-shear viscosity of the polymer matrix for each sample during lamination is also reported in Table 4, below.

Figure 3:
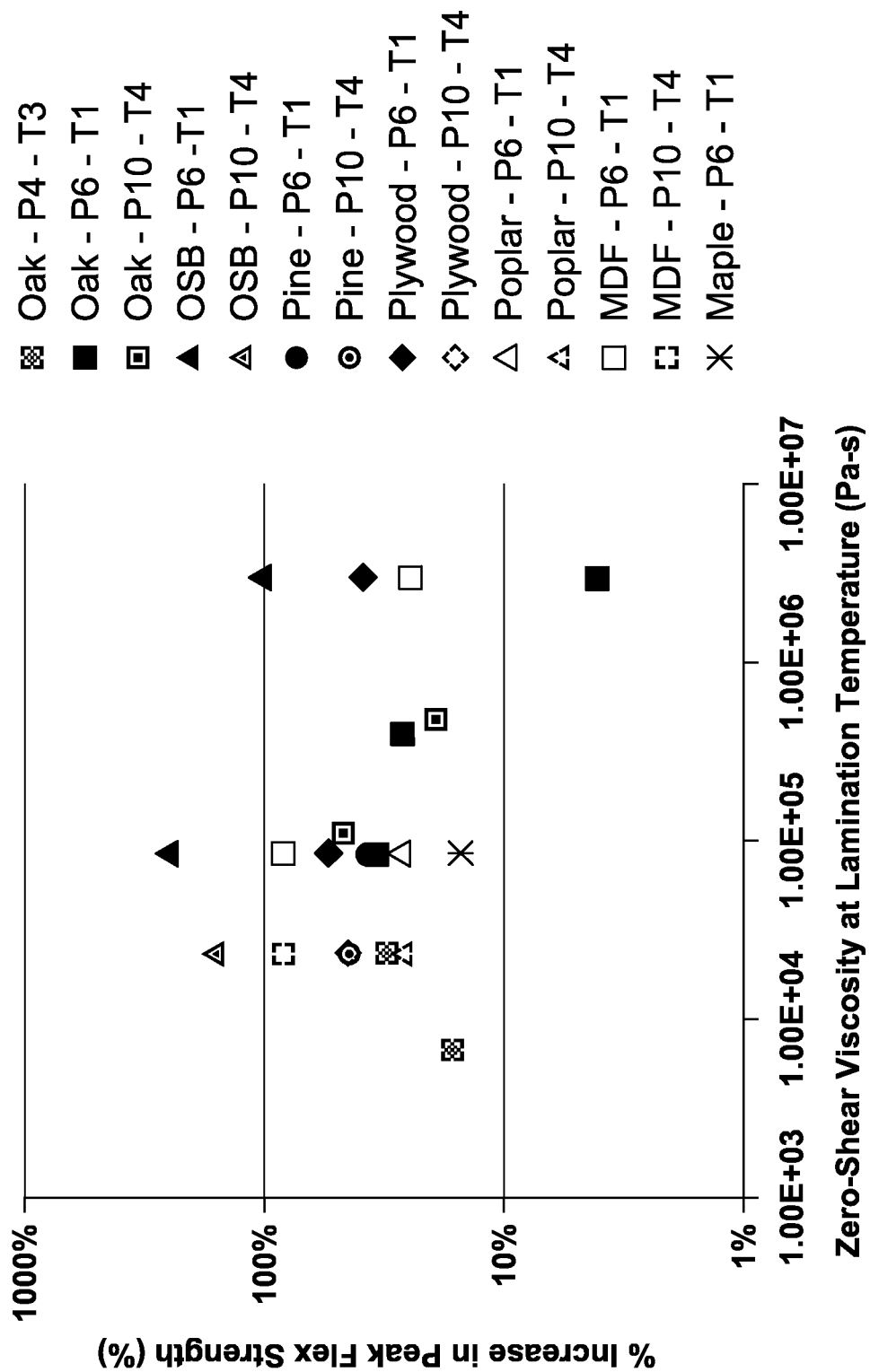
FIG. 3 depicts a graph comparing the zero-shear viscosity at lamination temperature to the increase in flexural strength in reinforced wood samples.
Figure 4:
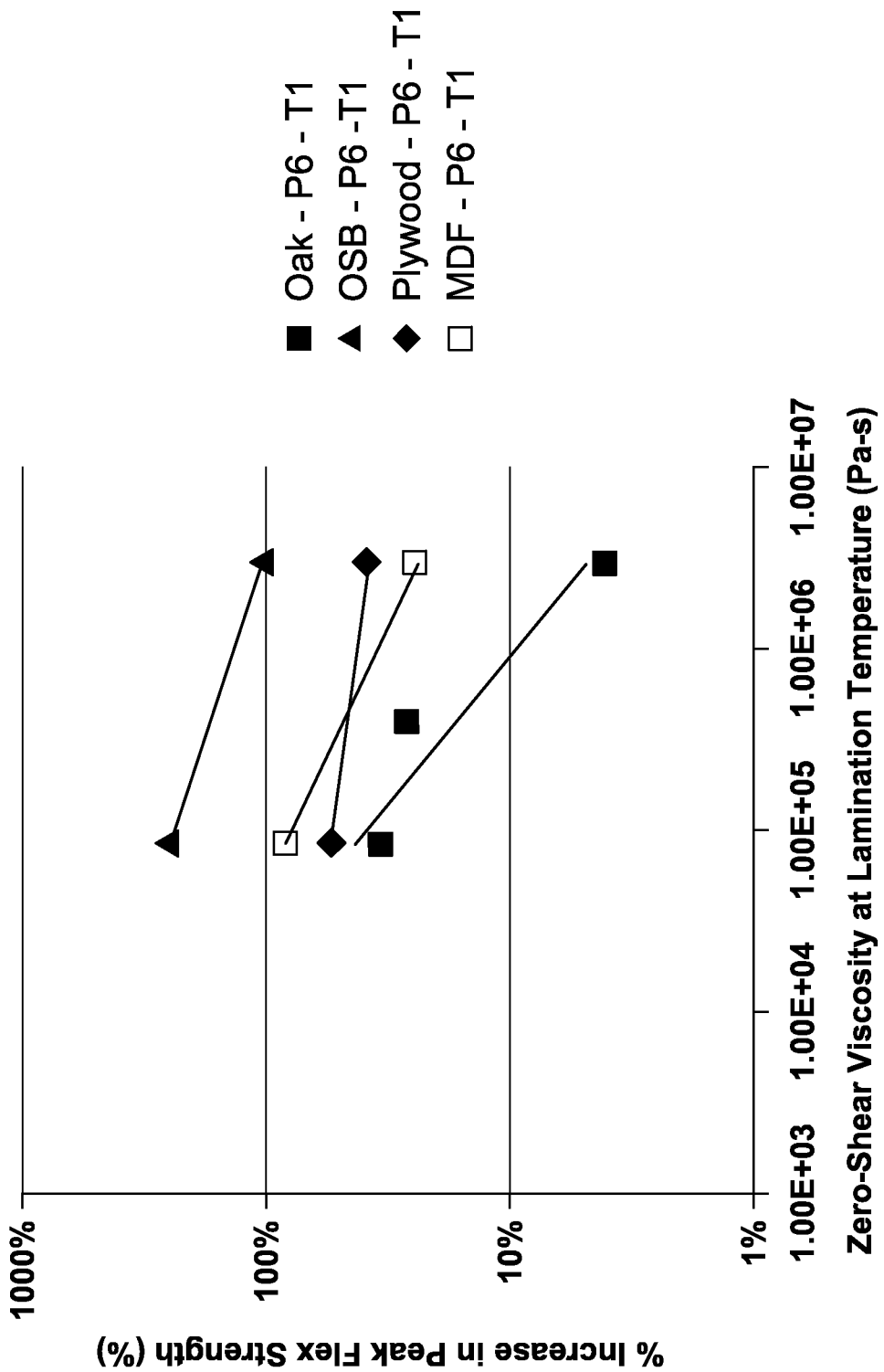
FIG. 4 depicts a graph comparing the zero-shear viscosity at lamination temperature to the increase in flexural strength in reinforced wood samples.

Table 4 and FIGS. 3 and 4 depict the flexural strength results (FS1-FS25) of the tested samples, which were derived from thermally bonding a single UDT layer onto the wood species shown. As noted above, Table 3 provides the initial flexural strength for all wood species considered in Table 4. In this study, each of the wood species in Table 3 was thermally bonded with at least one of the available UDTs (T1-T5 from Table 2), which were comprised of polymers P4, P6, P10, or P11. Table 4 provides the peak flexural strength for each tested sample, along with the coefficient of variation ("COV") in the measurement.

The flex increase in performance is a percentage improvement relative to the neat/untreated wood, calculated as follows:

$$\frac{FS_{wood-UDT} - FS_{wood}}{FS_{wood}}$$

The values obtained from the above formula were multiplied by 100 to calculate the percent improvement. It should be noted that values for $FS_{wood}$ are reported in Table 3. Summarizing the data shown in Table 4 and presented graphically in FIGS. 3 and 4, the following conclusions were found:

Oak showed a 15-45% improvement in flexural strength;
Poplar showed a 27-30% improvement in flexural strength;
Maple showed a 15% improvement in flexural strength;
Pine showed a 35-45% improvement in flexural strength;
Plywood showed a 45-55% improvement in flexural strength;
OSB showed a 165-250% improvement in flexural strength; and
MDF showed a 80-85% improvement in flexural strength.

TABLE 4

Flexural Strength Tests (ASTM D 790)

| ID # | Wood | Polymer ID # | Tape ID # | Temperature [° C.] | η0 [Pa · s] | Flex Strength [MPa] | COV [%] | Flex Increase [%] |
|---|---|---|---|---|---|---|---|---|
| FS1 | Oak | P6 | T1 | — | — | 164.3 | — | 5.6% |
| FS2 | Oak | P6 | T1 | 115 | 2.92E+06 | 161.9 | 0.0% | 4.0% |
| FS3 | Oak | P6 | T1 | 130 | 4.02E+05 | 196.3 | 3.6% | 26.1% |
| FS4 | Oak | P6 | T1 | 145 | 8.34E+04 | 207.5 | 5.9% | 33.4% |
| FS5 | Oak | P4 | T3 | 145 | 6.84E+03 | 180.7 | 6.2% | 16.2% |
| FS6 | Oak | P4 | T2 | 145 | 2.51E+04 | 203.3 | 16.8% | 30.6% |
| FS9 | Oak | P11 | T5 | 160 | 1.75E+04 | 188.2 | 6.6% | 20.9% |
| FS10 | Oak | P10 | T4 | 145 | 4.81E+05 | 185.0 | 13.3% | 18.9% |
| FS11 | Oak | P10 | T4 | 160 | 1.12E+05 | 226.4 | 6.4% | 45.5% |
| FS12 | Pine | P6 | T1 | 145 | 8.34E+04 | 145.7 | 19.6% | 36.5% |
| FS13 | Pine | P10 | T4 | 180 | 2.32E+04 | 152.8 | 6.3% | 43.1% |
| FS14 | Poplar | P6 | T1 | 145 | 8.34E+04 | 171.0 | 0.8% | 27.8% |
| FS15 | Poplar | P10 | T4 | 180 | 2.32E+04 | 169.8 | 0.1% | 26.9% |
| FS16 | Maple | P6 | T1 | 145 | 8.34E+04 | 233.1 | 1.3% | 15.1% |
| FS17 | MDF | P6 | T1 | 115 | 2.92E+06 | 61.1 | 15.0% | 23.8% |
| FS18 | MDF | P6 | T1 | 145 | 8.34E+04 | 90.6 | 7.0% | 83.5% |
| FS19 | MDF | P10 | T4 | 180 | 2.32E+04 | 89.3 | 6.5% | 80.8% |
| FS20 | OSB | P6 | T1 | 115 | 2.92E+06 | 23.4 | 14.3% | 105.4% |
| FS21 | OSB | P6 | T1 | 145 | 8.34E+04 | 40.1 | 1.6% | 252.5% |
| FS22 | OSB | P10 | T4 | 180 | 2.32E+04 | 30.1 | 6.3% | 164.8% |
| FS23 | Plywood | P6 | T1 | 115 | 2.92E+06 | 150.6 | 5.3% | 38.0% |
| FS24 | Plywood | P6 | T1 | 145 | 8.34E+04 | 168.5 | 22.5% | 54.3% |
| FS25 | Plywood | P10 | T4 | 180 | 2.32E+04 | 158.4 | 12.0% | 45.1% |

It should be evident from these results depicted in Table 4 that the magnitude of strength improvement is dependent upon the wood species and its specific mechanical properties, such as modulus of elasticity (Table 3). Generally, the lower modulus woods exhibit a larger percentage-based strength improvement when a UDT is applied on specimens having the same thickness. The softwood (pine) and hardwood (oak, poplar, and maple) species all exhibit performance improvements of at least 15 percent and up to 50 percent. For the engineered woods where adhesives are used to construct either particle-based composites (MDF and OSB) or ply-based composites (plywood), the performance improvements were measured to be 45 to 250 percent.

tapes were laminated at 145° C. for 5 minutes at a pressure of about 1.72 MPa. Additionally, different layered configurations were also observed for this study. In particular, the tested samples contained one of the following configurations: neat polyester film bound directly on the wood substrate ("WF"), a tape/UDT directly bound on the wood substrate ("WT"), a sample having a wood/polyester film/tape configuration ("WFT"), and a sample having a wood substrate with four UDT layers laminated thereon ("WTTTT"). In samples where a polyester film was present between the wood substrate and UDT (i.e., the WFT configuration), the films were produced with the P6 polyester and had a thickness of about 50.8 microns.

TABLE 5

| ID# | Wood | Polymer ID# | Sample | Glass Loading [wt %] | Structure | Flex Strength [MPa] | COV [%] | Flex Increase [%] |
|---|---|---|---|---|---|---|---|---|
| SG1 | Oak | P6 | Film | 0 | WF | 152.8 | 11.9% | −1.8% |
| SG2 | Oak | P6 | SG Film | 20 | WFT | 159.9 | 7.4% | 2.8% |
| SG3 | Oak | P3 | SG Film | 20 | WT | 139.3 | 2.9% | −10.5% |
| SG4 | Oak | P3 | SG Film | 20 | WFT | 126.6 | 2.5% | −18.6% |
| SG5 | Oak | P6 | UDT (T1) | 60 | WT | 207.5 | 5.9% | 33.4% |
| SG6 | Oak | P6 | UDT (T1) | 60 | WFT | 215.7 | 8.5% | 38.6% |
| SG7 | Oak | P6 | UDT(T1) | 60 | WTTTT | 224.9 | — | 44.5% |

Although Applicants do not wish to be bound by any theory, it is believed that OSB likely shows such a high improvement because of the compressive failure of the substrate due to the high tensile strength of the bottom UDT layer.

FIG. 3 and FIG. 4 show that viscosity of the polymer matrix phase of the UDT during lamination significantly affects the magnitude of the strength benefit that is obtained. Generally, larger strength benefits for a single layer of UDT are most desirable. As such, FIG. 3. and FIG. 4 suggest that improved or maximal benefit in regard to increasing flexural strength likely occurs with polyesters in the viscosity range of $10^4$-$10^6$ Pa-s.

The data from Table 4 shows that there is no significant difference in flexural benefit provided based on whether P4, P6, P10, or P11 was used as the matrix polymer. Given that the variation (COV) is around 10%, the statistical differences between these various polyesters at the same viscosity and with the same wood substrate are not considered significant. As such, these polyester-based UDTs are considered suitable for this invention. In particular, Table 4 demonstrates that polyesters with either Case 1 or Case 2 morphologies are suitable for UDTs in this case.

Example 5—Comparing UDT with Polymer and Fiber Films

In this example, the inventive UDTs were compared with wood samples only coated with pure polymer films or short/chopped glass loaded tapes containing 20 weight percent of glass. The comparative short-glass tapes were prepared by twin-screw compounding a polyester resin (P3 or P6) with short-glass chopped fiber from PPG Industries (Chopvantage® 3790) into pellets, which were then extruded into a film using the single-screw Killion extruders described previously. Oak substrates were laminated with a polyester film containing P6 (see Table 1), short-glass (SG) tapes containing either P3 or P6, and inventive UDTs containing P6. The Carver Press was used to prepare the specimens using the process described above. The films and As shown in Table 5, the comparative examples (SG1-SG4) either show a negative effect (SG1, SG3, and SG4) or minimal positive effect (SG2) on the flexural strength of the wood species (−18.6% to 2.8%). In contrast, the inventive UDTs (SG5-SG7) clearly demonstrated positive effects on the flexural strength of the wood (~33-45% benefit). In particular, this example demonstrates that continually aligned glass fiber (i.e., not short glass fibers) in UDTs is preferred for obtaining the strength benefits described in this invention.

Example 6—Correlation Between Flexural Strength and Adhesion Strength

In order for a UDT to provide reinforcement to any of the wood species, its polymer must form a sufficiently strong bond with the wood substrate following the thermal bonding process. The correlation between the block shear stress and the improvement in flexural strength was evaluated. As discussed above, the block shear stress provides an indication of adhesion strength of the particular polyester resin. The inventive samples (FB2-FB11) were created by laminating a UDT on the wood substrate using a Carver Press as described above. The lamination occurred at pressures of about 1.72 MPa for about 5 minutes. The lamination temperature of each UDT is indicated in Table 6, below. The corresponding polyester film for each of the UDTs was separately laminated on the wood substrate under the same lamination conditions for the block shear tests. Sample FB1 functioned as the control wherein the UDT (T1) was simply placed adjacent to the wood surface during the flexural strength test without being thermally bonded thereon.

Figure 5:
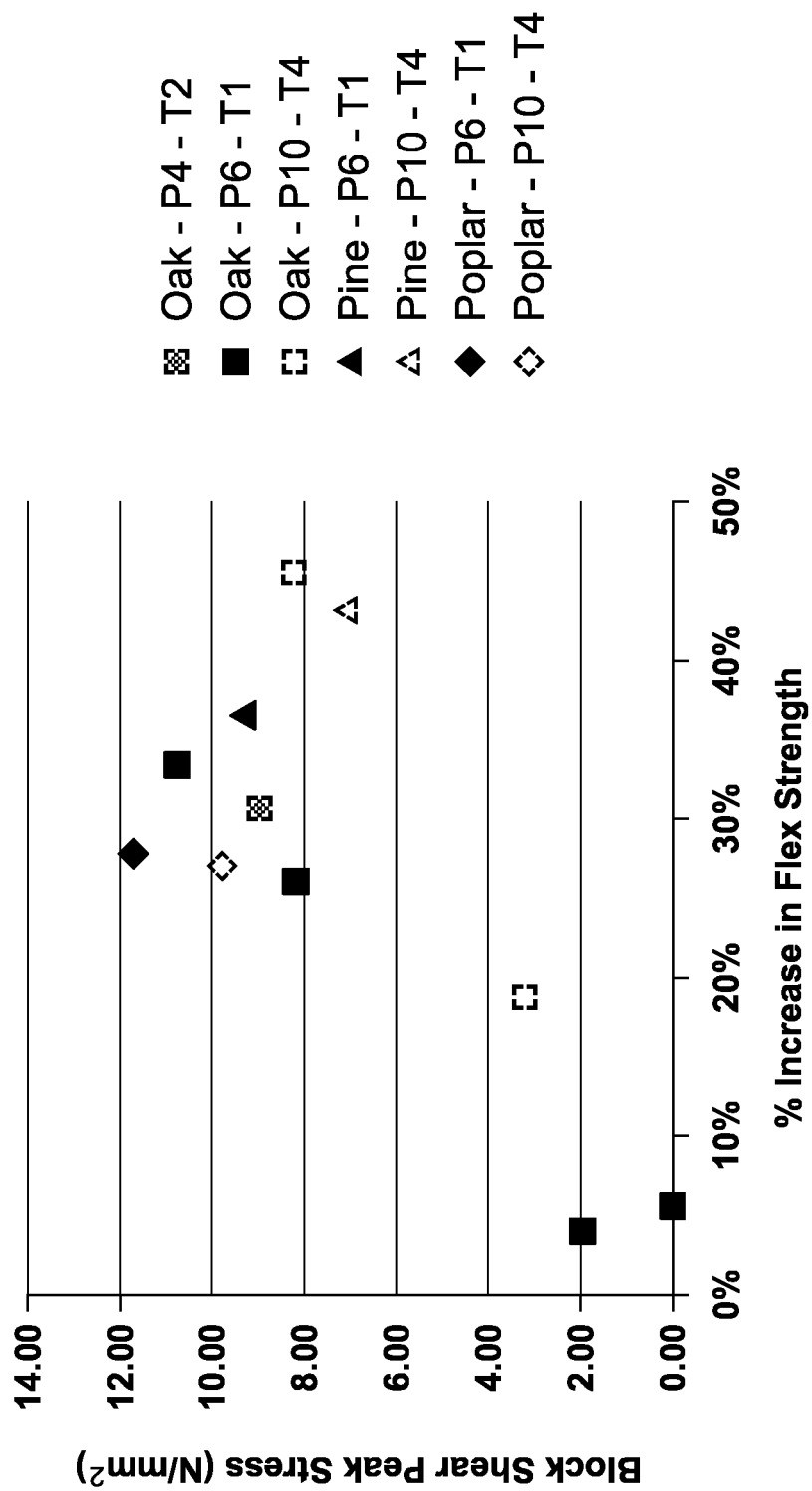
FIG. 5 depicts a graph comparing the flexural strength to the bond strength in the reinforced wood samples.

Table 6, below, and FIG. 5 show a correlation between the flexural strength benefit (% increase in flexural strength) provided by the inventive UDTs and the block shear peak stress measured with a neat film of the same polyester used in the respective UDT. The block shear test essentially provides a measure of the bond strength between the polymer film and wood. As noted above, the thermal bonding conditions for these two tests were the same in order to permit a comparison between these two tests and the resulting data, as shown in FIG. 5. Consequently, this provided insight on the desired range of bond strengths for reinforcing wood by increasing the flexural strength to desired levels.

strength and reinforcement benefit is desired. In many applications, the polyester film should produce a bond strength of at least 5 N/mm$^2$ and, in some cases, most preferably at least 7 N/mm$^2$ to be useful for producing a UDT that provides the maximal flexural strength benefit (e.g., 30 to 50 percent) to hardwoods and softwoods. As

TABLE 6

| | | | | | Block Shear | | Flexural Test | |
| | | | | | | | | |
| ID # | Wood | Polymer ID # | Tape # | Temperature [° C.] | Film η$_0$ [Pa · s] | Peak Stress [MPa] | COV [%] | Flex Strength [MPa] | COV [%] | Flex Increase [%] |
| --- | --- | --- | --- | --- | --- | --- | --- | --- | --- | --- |
| FB1 | Oak | P6 | T1 | — | — | 0.00 | 0% | 164.3 | — | 5.6% |
| FB2 | Oak | P4 | T2 | 145 | 8.89E+04 | 8.97 | 34% | 203.3 | 16.8% | 30.6% |
| FB3 | Oak | P6 | T1 | 115 | 4.27E+06 | 1.91 | 51.7% | 161.9 | 0.0% | 4.0% |
| FB4 | Oak | P6 | T1 | 130 | 5.88E+05 | 8.21 | 31.5% | 196.3 | 3.6% | 26.1% |
| FB5 | Oak | P6 | T1 | 145 | 1.22E+05 | 10.78 | 18% | 207.5 | 5.9% | 33.4% |
| FB6 | Oak | P10 | T4 | 145 | 1.10E+06 | 3.20 | 31% | 185.0 | 13.3% | 18.9% |
| FB7 | Oak | P10 | T4 | 160 | 2.56E+05 | 8.25 | 10% | 226.4 | 6.4% | 45.5% |
| FB8 | Pine | P6 | T1 | 145 | 1.22E+05 | 9.31 | 12.7% | 145.7 | 19.6% | 36.5% |
| FB9 | Pine | P10 | T4 | 180 | 5.33E+04 | 7.10 | 42.4% | 152.8 | 6.3% | 43.1% |
| FB10 | Poplar | P6 | T1 | 145 | 1.22E+05 | 11.72 | 4.7% | 171.0 | 0.8% | 27.8% |
| FB11 | Poplar | P10 | T4 | 180 | 5.33E+04 | 9.75 | 12.0% | 169.8 | 0.1% | 26.9% |

As shown in Table 6, Control FB1 only showed a 5.6 percent improvement in flexural strength, which was significantly below the flexural strength properties obtained in Table 4. This control confirmed that there must be some bonding between the UDT and wood in order for the inventive UDTs to provide the desired flexural strength.

In addition, Table 6 and FIG. 5 demonstrate that it is most preferable for the polymer film to exhibit bond strengths of at least 3 N/mm$^2$ for that polymer to be useful for producing a UDT that can significantly reinforce hardwoods or softwoods (by at least 15 percent improvement in the peak flexural strength). This is based on sample FB5, which showed a peak stress of 3.20 N/mm$^2$ during block shear testing and a corresponding flexural strength improvement of 18.9 percent. This flexural peak strength improvement for FB5 is believed to represent the approximate lower limit for an appropriate polyester film of the present invention. The majority of the data in Table 6 shows film peak stress values that are in the 7 to 12 N/mm$^2$ range and flexural strength benefits of 30 to 50 percent, which are desirable for commercial applications where the improved or maximal bond explained in more detail later, drawing a similar correlation is not possible for the engineered woods, believed to be due primarily to the fact that these wood substrates themselves fail first at much lower stress values (0 to 3 N/mm$^2$) during the block shear test and thereby compromise the meaningfulness of this measurement.

Example 7—Block Shear Tests for Tested Polymers on Wood

Block shear tests were conducted on the polymers listed in Table 1 to observe the bond strengths of these polymers on an oak substrate.

Figure 6:
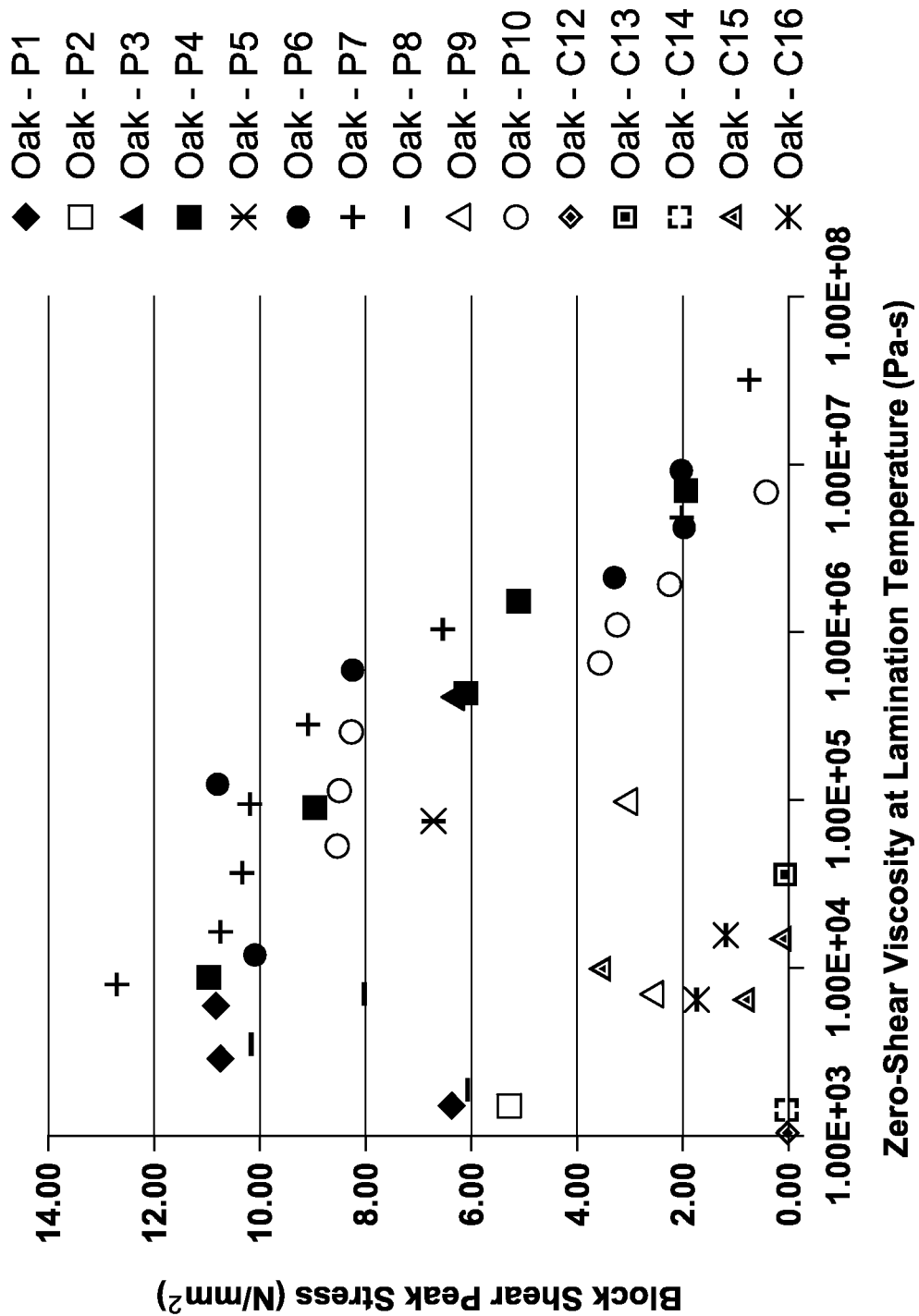
FIG. 6 depicts a graph comparing the zero-shear viscosity at lamination temperature to the block shear peak stress of polymer films.
Figure 7:
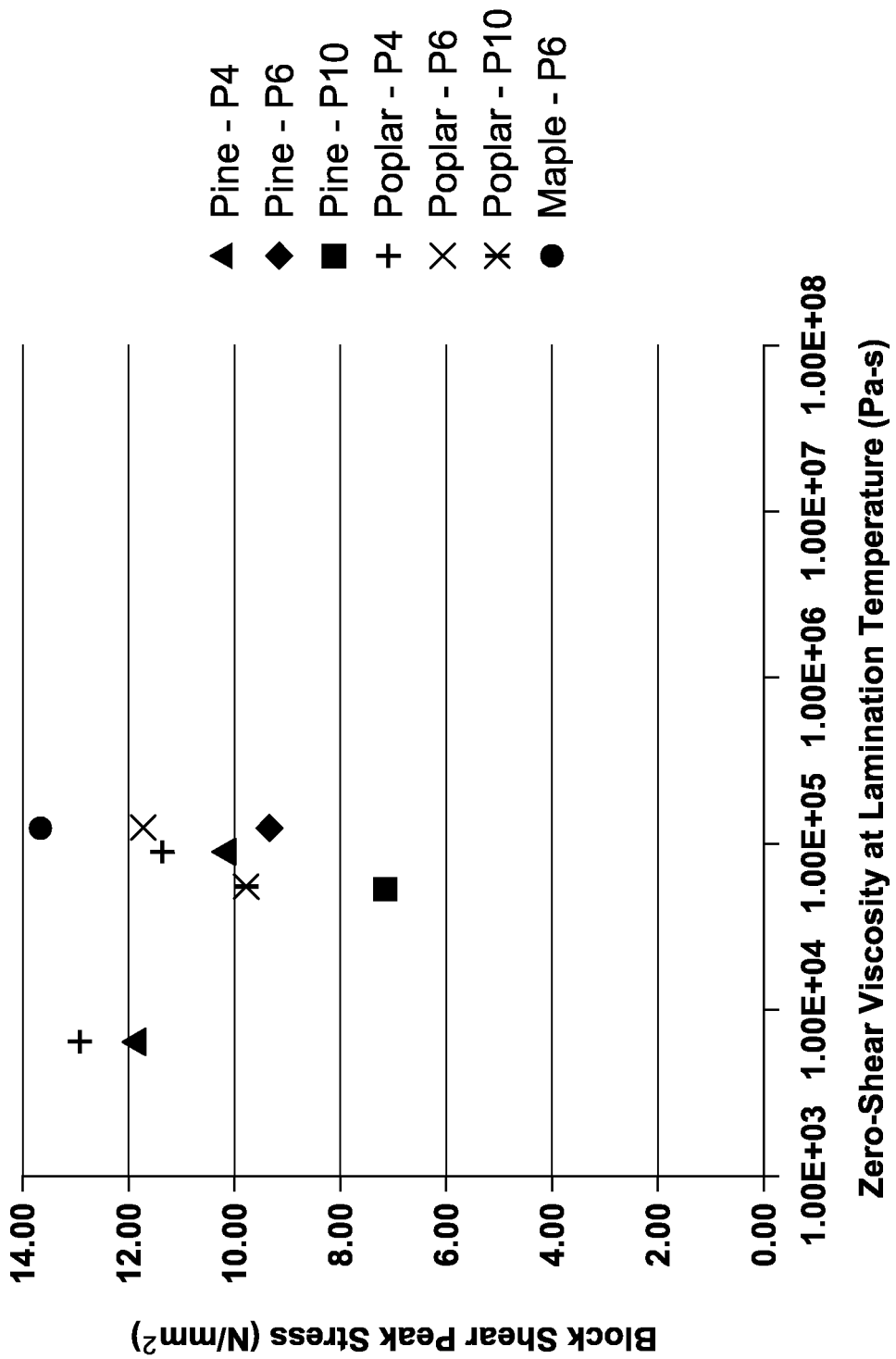
FIG. 7 depicts a graph comparing the zero-shear viscosity at lamination temperature to the block shear peak stress of polymer films.

Table 7 and FIG. 6 show the block shear test results for the polymers which were bonded to an oak wood substrate. In each case, thermal bonding was conducted on a neat polymer film of the polymer for 5 minutes, at pressures of 1.72 MPa, and temperatures (and corresponding zero-shear viscosities) as listed in Table 7. Similarly, Table 8 and FIG. 7 show data for pine, poplar, and maple wood.

TABLE 7

Block Shear Testing on Polymer Films (Wood/Film/Wood)

| ID # | Wood | Polymer ID # | Temp. [° C.] | η$_0$ [Pa · s] | Peak Stress [MPa] | COV [%] | Ratio of Load/Compressive Strength of Wood [%] |
| --- | --- | --- | --- | --- | --- | --- | --- |
| BS1 | Oak | P1 | 160 | 5.81E+03 | 10.79 | 18% | 82% |
| BS2 | Oak | P1 | 170 | 2.81E+03 | 10.72 | 33% | 82% |
| BS3 | Oak | P1 | 180 | 1.47E+03 | 6.35 | 91% | 48% |
| BS4 | Oak | P2 | 145 | 1.47E+03 | 5.19 | 28.9% | 40% |
| BS5 | Oak | P3 | 145 | 4.07E+05 | 6.32 | 39.4% | 48% |
| BS6 | Oak | P4 | 110 | 6.79E+06 | 1.91 | 113% | 15% |
| BS7 | Oak | P4 | 120 | 1.52E+06 | 5.09 | 14% | 39% |
| BS8 | Oak | P4 | 130 | 4.28E+05 | 6.08 | 11% | 46% |
| BS9 | Oak | P4 | 145 | 8.89E+04 | 8.97 | 34% | 68% |
| BS10 | Oak | P4 | 175 | 8.60E+03 | 10.95 | 13% | 83% |
| BS11 | Oak | P5 | 145 | 7.41E+04 | 6.71 | 58.4% | 51% |
| BS12 | Oak | P6 | 110 | 9.32E+06 | 1.98 | 121% | 15% |
| BS13 | Oak | P6 | 115 | 4.27E+06 | 1.91 | 51.7% | 15% |
| BS14 | Oak | P6 | 120 | 2.09E+06 | 3.24 | 42% | 25% |
| BS15 | Oak | P6 | 130 | 5.88E+05 | 8.21 | 31.5% | 63% |
| BS16 | Oak | P6 | 145 | 1.22E+05 | 10.78 | 18% | 82% |

TABLE 7-continued

Block Shear Testing on Polymer Films (Wood/Film/Wood)

| ID # | Wood | Polymer ID # | Temp. [° C.] | $\eta_0$ [Pa·s] | Peak Stress [MPa] | COV [%] | Ratio of Load/Compressive Strength of Wood [%] |
|---|---|---|---|---|---|---|---|
| BS17 | Oak | P6 | 175 | 1.18E+04 | 10.04 | 33% | 76% |
| BS18 | Oak | P7 | 110 | 3.13E+07 | 0.71 | 124% | 5% |
| BS19 | Oak | P7 | 120 | 4.80E+06 | 1.96 | 89% | 15% |
| BS20 | Oak | P7 | 130 | 1.02E+06 | 6.50 | 57% | 50% |
| BS21 | Oak | P7 | 140 | 2.81E+05 | 9.03 | 11% | 69% |
| BS22 | Oak | P7 | 150 | 9.37E+04 | 10.17 | 10% | 77% |
| BS23 | Oak | P7 | 160 | 3.64E+04 | 10.31 | 39% | 79% |
| BS24 | Oak | P7 | 170 | 1.60E+04 | 10.72 | 36% | 82% |
| BS25 | Oak | P7 | 180 | 7.79E+03 | 12.72 | 15% | 97% |
| BS26 | Oak | P8 | 110 | 6.04E+03 | 8.03 | 42.3% | 61% |
| BS27 | Oak | P8 | 130 | 2.96E+03 | 10.12 | 26.8% | 77% |
| BS28 | Oak | P8 | 150 | 1.61E+03 | 6.04 | 52.1% | 46% |
| BS29 | Oak | P9 | 145 | 9.57E+04 | 3.06 | 30.3% | 23% |
| BS30 | Oak | P9 | 180 | 6.77E+03 | 2.55 | 28.5% | 19% |
| BS31 | Oak | P10 | 130 | 6.98E+06 | 0.33 | 22% | 3% |
| BS32 | Oak | P10 | 140 | 1.94E+06 | 2.19 | 25% | 17% |
| BS33 | Oak | P10 | 145 | 1.10E+06 | 3.20 | 31% | 24% |
| BS34 | Oak | P10 | 150 | 6.55E+05 | 3.50 | 17% | 27% |
| BS35 | Oak | P10 | 160 | 2.56E+05 | 8.25 | 10% | 63% |
| BS36 | Oak | P10 | 170 | 1.12E+05 | 8.48 | 27% | 65% |
| BS37 | Oak | P10 | 180 | 5.33E+04 | 8.50 | 23% | 65% |
| BS38 | Oak | PC12 | 180 | 1.02E+03 | 0.00 | 0.0% | 0% |
| BS39 | Oak | PC13 | 180 | 3.58E+04 | 0.00 | 0.0% | 0% |
| BS40 | Oak | PC15 | 130 | 1.46E+04 | 0.14 | 68.3% | 1% |
| BS41 | Oak | PC15 | 160 | 9.62E+03 | 3.54 | 76.2% | 27% |
| BS42 | Oak | PC15 | 180 | 6.31E+03 | 0.82 | 66.2% | 6% |
| BS43 | Oak | PC14 | 180 | 1.39E+03 | 0.00 | 0.0% | 0% |
| BS44 | Oak | PC16 | 150 | 1.53E+04 | 1.15 | 54.1% | 9% |
| BS45 | Oak | PC16 | 180 | 6.26E+03 | 1.71 | 86.4% | 13% |

TABLE 8

Block Shear Testing on Polymer Films (Wood/Film/Wood)

| ID # | Wood | Polymer ID # | Temperature [° C.] | $\eta_0$ [Pa·s] | Peak Stress [MPa] | COV [%] | Ratio of Load/Compressive Strength of Wood [%] |
|---|---|---|---|---|---|---|---|
| BS46 | Pine | P4 | 145 | 8.89E+04 | 10.20 | 12.2% | 99% |
| BS47 | Pine | P4 | 180 | 6.29E+03 | 11.91 | 15.4% | 115% |
| BS48 | Pine | P6 | 145 | 1.22E+05 | 9.31 | 12.7% | 90% |
| BS49 | Pine | P10 | 180 | 5.33E+04 | 7.10 | 42.4% | 69% |
| BS50 | Poplar | P4 | 145 | 8.89E+04 | 11.35 | 41.6% | 95% |
| BS51 | Poplar | P4 | 180 | 6.29E+03 | 12.94 | 12.1% | 108% |
| BS52 | Poplar | P6 | 145 | 1.22E+05 | 11.72 | 4.7% | 98% |
| BS53 | Poplar | P10 | 180 | 5.33E+04 | 9.75 | 12.0% | 82% |
| BS54 | Maple | P6 | 145 | 1.22E+05 | 13.65 | 14.6% | 97% |

First, the data from Table 7 and FIG. 6 show that all of the polyester materials considered (P1-P10), regardless of composition, additive type, IhV, Tg, or morphology, exhibited very high bond strengths, relative to the non-polyester resins considered (C12-C16). Generally speaking, FIG. 6 shows that at the same zero-shear viscosity during bonding, the polyesters tended to exhibit bond strengths that were at least twice, and in many cases, four times the bond strength of the non-polyester materials. This data certainly shows the superiority of polyester useful in this invention.

Second, Table 7 and FIG. 6 demonstrate that the ideal viscosity range for thermal bonding of the polyester materials range from $10^3$-$10^7$ Pa-s, with a narrower range of $10^4$-$10^6$ Pa-s obtaining even more desirable bond strengths. These viscosities occur during bonding at 30 to 250° C. (dictated by the limits of wood as discussed previously). For the polymers studied in Table 7, it appears that the ideal viscosity ranges and resulting bond strengths occurred when thermal bonding was conducted at temperatures ranging from Tg+25° C. to Tg+75° C., but below 250° C. where wood degrades. These temperatures were typically the most appropriate bonding conditions for Case 1 and Case 2 polymers.

Third, it should be apparent from Table 7 and FIG. 6 that there is essentially no apparent difference in performance between the various polyester materials considered, indicating once more that the particular composition, IhV or additive type is not critical to obtaining a strong bond. This result was surprising and unexpected, given that non-polyester resins showed such distinctly different performances. It should be noted that this same conclusion was observed in the flexural strength data of Table 4, where the specific polyester resin did not appear to matter significantly.

The lone exception appears to be the samples containing polymer P9 (BS29, BS30) in Table 7, which showed bond strengths in the $10^4$ to $10^6$ Pa-s viscosity range of only 2.5 to 3.1 N/mm². Thus, the bond strengths for samples BS29 and BS30 were generally much lower than the bond strengths seen with other polyesters in Table 7 at comparable conditions (i.e., >6 N/mm²). Without wishing to be bound by any theory, Applicants believe this exception is related to the fact that P9 has a Case 2 morphology, thus the film crystallizes during the thermal bonding process, presumably weakening the final bond strength of the film. Nevertheless, samples containing P9 and any other Case 2 polyesters are still useful for this invention for several reasons. First, P8 samples in Table 7 (BS26-BS28) also contain Case 2 morphologies and all show comparable bond strengths to Case 1 polymers (P1-P7). This data teaches that Case 1 and Case 2 polyesters are both satisfactory examples of this invention, but that Case 1 morphologies may generally be preferred when maximizing bond strength.

Table 8 and FIG. 7 demonstrate similar data for the pine, poplar, and maple wood species. As depicted in Table 8, the bond strengths for the three polymers considered (P4, P6, and 10) were at least 6 N/mm² for the sampled hardwoods (oak, maple, and poplar) and softwood (pine). This data in Table 8 demonstrates that the inventive UDTs and their polyesters are applicable to multiple types of hardwood and softwood.

Example 8—Block Shear Tests for Tested Polymers on Engineered Woods

Table 9 shows the results from attempting to measure the bond strength of polymer films applied to engineered wood substrates, such as OSB, plywood, and MDF. For this study, films formed from various polymers and comparative polymers were thermally bonded to MDF, OSB, and plywood substrates using a Carver Press for 5 minutes at a pressure of about 1.72 MPa. The temperatures for each lamination are provided in Table 9.

Engineered woods are typically formed by manufacturers who glue together multiple veneer layers (in the case of plywood) or individual particles and chips (in the case of MDF or OSB) to form woods that are useful in many building and construction applications. Consequently, the inherit shear strengths of these engineered woods tend to be dictated mostly by the internal glue-line strength of the woods, which are significantly lower than most all hardwood and softwood species. Table 3 provides the internal shear strengths of MDF and OSB and the internal laminar shear strength of plywood, which are markedly lower (0.4-1.6 MPa) than the compressive strengths of the hardwood and softwood species (33-45 MPa). Thus, thermally bonding together two blocks of the engineered wood species with a polymer film and testing this in the block shear test apparatus frequently resulted in significant cohesive failure of the wood, rather than primary failure at the film-wood adhesion interface (i.e., the bond being tested for block shear strength).

To show that this was an expected result, Tables 7-9 report a ratio of the load on the sample at failure relative to the load that the wood species is expected to withstand based on its known compressive strength (or internal bond strength for the case of engineered woods) shown in Table 3. In order for the block shear test to adequately provide a meaningful and comparable measure of polymer film bond strength for a given wood substrate, this ratio should be less than 120 percent, and preferably less than 100 percent, implying that the primary failure mode is due to adhesive failure of the film. This was seen to be the case for all of the hardwood and softwood samples reported in Tables 7 and 8. In contrast, the engineered woods all show values that significantly exceed 100 percent, ranging as high as 2,000 percent in select cases. In these tests the primary failure mode was cohesive failure of the wood. When this happens, the wood fails before the thermally bonded film and the measurement is not useful for quantifying the bond strength of a polymer to these wood substrates.

TABLE 9

Block Shear Testing on Polymer Films (Wood/Film/Wood)

| ID # | Wood | Polymer ID # | Temperature [° C.] | $\eta_0$ [Pa · s] | Peak Stress [MPa] | COV [%] | Ratio of Load/Internal Shear Strength of Wood [%] |
|---|---|---|---|---|---|---|---|
| BS55 | MDF | P4 | 145 | 8.89E+04 | 1.92 | 14.2% | 575% |
| BS56 | MDF | P4 | 180 | 6.29E+03 | — | — | — |
| BS57 | MDF | P6 | 145 | 1.22E+05 | 1.03 | 59.1% | 309% |
| BS58 | MDF | P10 | 180 | 5.33E+04 | 1.53 | 14.3% | 457% |
| BS59 | OSB | P4 | 145 | 8.89E+04 | 1.13 | 63.4% | 903% |
| BS60 | OSB | P4 | 180 | 6.29E+03 | 1.68 | 17.9% | 1346% |
| BS61 | OSB | P6 | 145 | 1.22E+05 | 0.32 | 22.6% | 256% |
| BS62 | OSB | P10 | 180 | 5.33E+04 | 2.42 | 10.6% | 1933% |
| BS63 | OSB | C15 | 130 | 1.46E+04 | 1.36 | 36.10% | 1086% |
| BS64 | OSB | C15 | 160 | 9.62E+03 | 2.28 | 7.10% | 1828% |
| BS65 | OSB | C15 | 180 | 6.31E+03 | 2.07 | 8.70% | 1653% |
| BS66 | OSB | C16 | 150 | 1.53E+04 | 1.35 | 33.50% | 1077% |
| BS67 | OSB | C16 | 180 | 6.26E+03 | 2.32 | 39.20% | 1852% |
| BS68 | Plywood | P4 | 145 | 8.89E+04 | 0.43 | 0.0% | 87% |
| BS69 | Plywood | P4 | 180 | 6.29E+03 | 1.96 | 14.1% | 393% |
| BS70 | Plywood | P6 | 145 | 1.22E+05 | 1.90 | 13.4% | 380% |
| BS71 | Plywood | P10 | 180 | 5.33E+04 | 0.80 | 49.2% | 160% |
| BS72 | Plywood | C15 | 130 | 1.46E+04 | 2.03 | 32.20% | 405% |
| BS73 | Plywood | C15 | 160 | 9.62E+03 | 1.81 | 13.30% | 363% |
| BS74 | Plywood | C15 | 180 | 6.31E+03 | 1.51 | 7.40% | 301% |
| BS75 | Plywood | C16 | 150 | 1.53E+04 | 1.55 | 30.60% | 310% |
| BS76 | Plywood | C16 | 180 | 6.26E+03 | 1.49 | 21.10% | 298% |

It is acceptable for polymer films to have a bond strength of 0.3 to 3.0 N/mm² when reinforcing engineered woods such as MDF, OSB, and plywood, as the data in Table 9 shows that engineered wood fails first and typically under peak stress values in the 0.3 to 2.3 N/mm² range. While a bond strength of at least 0.3 N/mm² may be acceptable for engineered woods, it is still preferable for the bond strength to be at least 3 N/mm² to be useful for producing a UDT that can significantly reinforce various engineered woods. Unfortunately, bond strengths of at least 3 N/mm² are not accurately measurable by this block shear technique due to the glue-line limitations of the engineered woods. However, as demonstrated in Table 4 and FIGS. 3 and 4, there is no issue obtaining a significant strength benefit using inventive polyesters (e.g., P4, P6, P10, and P11) in a UDT to reinforce engineered woods such as plywood, OSB, and MDF, and provide an increase in peak flexural strength. As shown in Table 4 and FIGS. 3 and 4, reinforced plywood and MDF showed a 45 to 85 percent improvement, whereas reinforced OSB showed a 165 to 250 percent improvement. Based on the block shear data showing that P4, P6, and P10 bond equally well to oak, pine, and poplar as do the other inventive polyesters (P1, P2, P3, P5, P8, and P9), a UDT comprised of any of these polyesters are also expected to strengthen engineered woods, particularly those comprising the woods tested here such as oak, pine, poplar or maple, to similar levels.

In summation, this example was meant to emphasize that it was not experimentally feasible to quantify the bond strength for the engineering woods like was done for the hardwood and softwoods due to significant cohesive failure of the wood during the block shear test method.

Example 9—Evaluating Lamination Conditions

This example shows that the strength of the bond and subsequent performance of the reinforced wood in a flexural strength test can be improved or optimized using a range of lamination times, lamination pressures, and inclusion of a thermoplastic polyester-based resin film layer in the reinforced material.

Table 10 presents the results for this example using polymers P4 and P6 on an oak substrate. As shown in Table 10, the lamination times, lamination pressures, and reinforced configurations were tested. In regard to the listed structures in Table 10, "WT" refers to wood/UDT configurations, "WFT" refers to wood/film/UDT configurations, "WTW" refers to wood/UDT/wood configurations, and "WFTFW" refers to wood/film/UDT/film/wood configurations. The polyester resin film layers (if present) were made from polymer P6. The same data from Table 10 is presented graphically in FIGS. 8 and 9, which show the flexural strength improvement and block shear peak stress benefit, respectively. Both the block shear test and flexural strength tests were conducted using lamination temperatures of 145° C.

TABLE 10

| ID # | Wood | Polymer | Tape | Resin Film of P6 [μm] | Time [min] | Pressure [MPa] | Block Shear Test Layers | Peak Stress [MPa] | COV [%] | Flexural Strength Test Layers | Flex Strength [MPa] | COV [%] | Flex Increase [%] |
|---|---|---|---|---|---|---|---|---|---|---|---|---|---|
| TP1 | Oak | P6 | T1 | 0.0 | 2.0 | 0.345 | — | — | — | WT | 164.5 | 17.8% | 5.7% |
| TP2 | Oak | P6 | T1 | 0.0 | 10.0 | 0.345 | — | — | — | WT | 192.8 | 7.8% | 23.9% |
| TP3 | Oak | P6 | T1 | 0.0 | 2.0 | 1.724 | — | — | — | WT | 174.3 | 6.8% | 12.0% |
| TP4 | Oak | P6 | T1 | 0.0 | 5.0 | 1.724 | WTW | 6.42 | 73.8% | WT | 207.5 | 5.9% | 33.4% |
| TP5 | Oak | P6 | T1 | 0.0 | 10.0 | 1.724 | — | — | — | WT | 225.5 | 1.4% | 44.9% |
| TP6 | Oak | P6 | T1 | 50.8 | 2.0 | 0.345 | — | — | — | WFT | 173.4 | 0.9% | 11.4% |
| TP7 | Oak | P6 | T1 | 50.8 | 10.0 | 0.345 | — | — | — | WFT | 201.1 | 22.6% | 29.2% |
| TP8 | Oak | P6 | T1 | 50.8 | 2.0 | 1.724 | — | — | — | WFT | 175.1 | 0.7% | 12.5% |
| TP9 | Oak | P6 | T1 | 50.8 | 5.0 | 1.724 | WFTFW | 9.91 | 30.1% | WFT | 235.2 | 2.1% | 51.2% |
| TP10 | Oak | P6 | T1 | 50.8 | 10.0 | 1.724 | — | — | — | WFT | 237.9 | 3.1% | 52.9% |
| TP11 | Oak | P6 | T1 | 127.0 | 2.0 | 0.345 | — | — | — | WFT | 174.0 | 5.8% | 11.8% |
| TP12 | Oak | P6 | T1 | 127.0 | 10.0 | 0.345 | — | — | — | WFT | 213.0 | 1.0% | 36.9% |
| TP13 | Oak | P6 | T1 | 127.0 | 5.0 | 1.724 | WFTFW | 11.74 | 6.1% | WFT | 239.5 | 4.4% | 53.9% |
| TP14 | Oak | P4 | T2 | 0.0 | 5.0 | 1.724 | WTW | 3.24 | 38.5% | WT | 203.3 | 16.8% | 30.6% |
| TP15 | Oak | P4 | T2 | 50.8 | 5.0 | 1.724 | WFTFW | 8.68 | 18.6% | WFT | 206.2 | 7.5% | 32.5% |
| TP16 | Oak | P4 | T2 | 127.0 | 5.0 | 1.724 | WFTFW | 12.07 | 14.3% | — | — | — | — |

Figure 8:
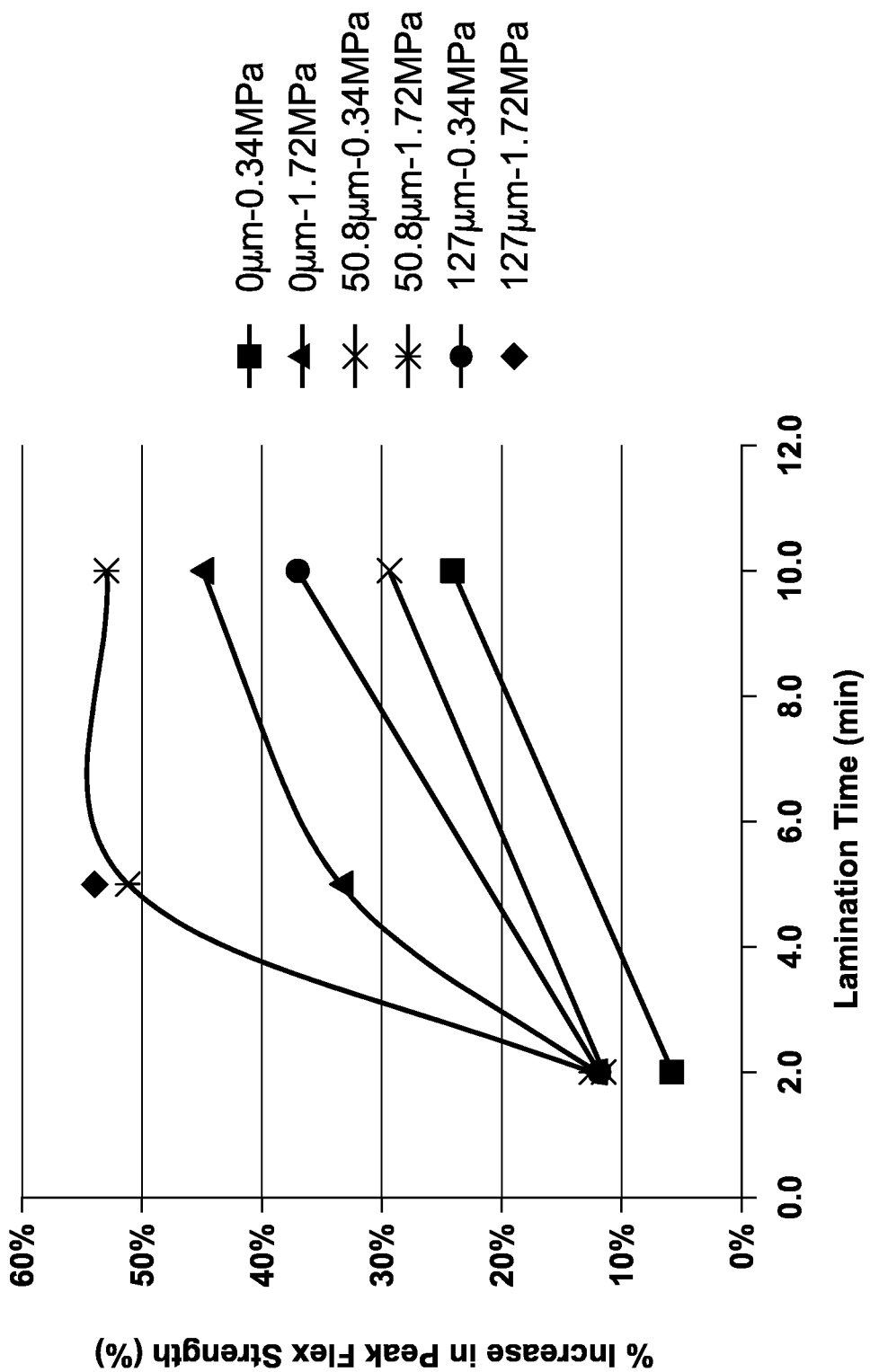
FIG. 8 depicts a graph showing the effects of lamination time on the resulting flexural strength of reinforced wood materials.

FIG. 8 shows that increased time during lamination generally improves the flexural strength benefit in cases with and without a polyester resin film layer. Increasing processing time results in improvement to the peak flexural strength with 10 percent improvement at 2 minutes and 45 to 55 percent improvement at 10 minutes with a pressure of 1.72 MPa. Without wishing to be bound by any theory, Applicants believe the reason for the improvement associated with longer bonding times is that the polymer is afforded more opportunity to penetrate into the porous wood structure. This results in an improved bond strength and subsequent performance benefit in the flexural test. The data from FIG. 8 show that higher applied pressures also significantly improve the bond properties. For example, at 10 minutes of bonding time, the flexural strength of the oak specimen improved from 24 percent to 45 percent based on raising the pressure during lamination from 0.34 MPa to 1.72 MPa. Similarly, when a polyester resin film layer was employed with 10 minutes of bonding time, the flexural strength of the oak specimen improved from 29 percent to 53 percent. It is known that the compressive strength of oak decreases linearly as temperature is increased within the 30 to 250° C. lamination window. For instance, at a lamination temperature of 145° C., the compressive strength of oak perpendicular to the grain, as in the case of the applied load here, is reduced to approximately 2.00 MPa, or roughly only 30 percent of the nominal compressive strength of oak at room temperature. As such, higher pressures than 1.72 MPa may not be desirable as it could crush and close off the porous structure of the wood, which reduces the bonding between the UDT and the wood. As such, in certain embodiments, times of 2 to 10 minutes and pressures of 0.34 to 1.72 MPa are typically preferred ranges for this invention. Alternatively, in embodiments where a continuous press operation is utilized, such as double-belt lamination or roll pressing, the data and trends in FIG. 8 would indicate that very high pressures of 2 to 12 MPa could enable sufficient bondings to occur at times as short as 0.1 to 5 seconds.

Figure 9:
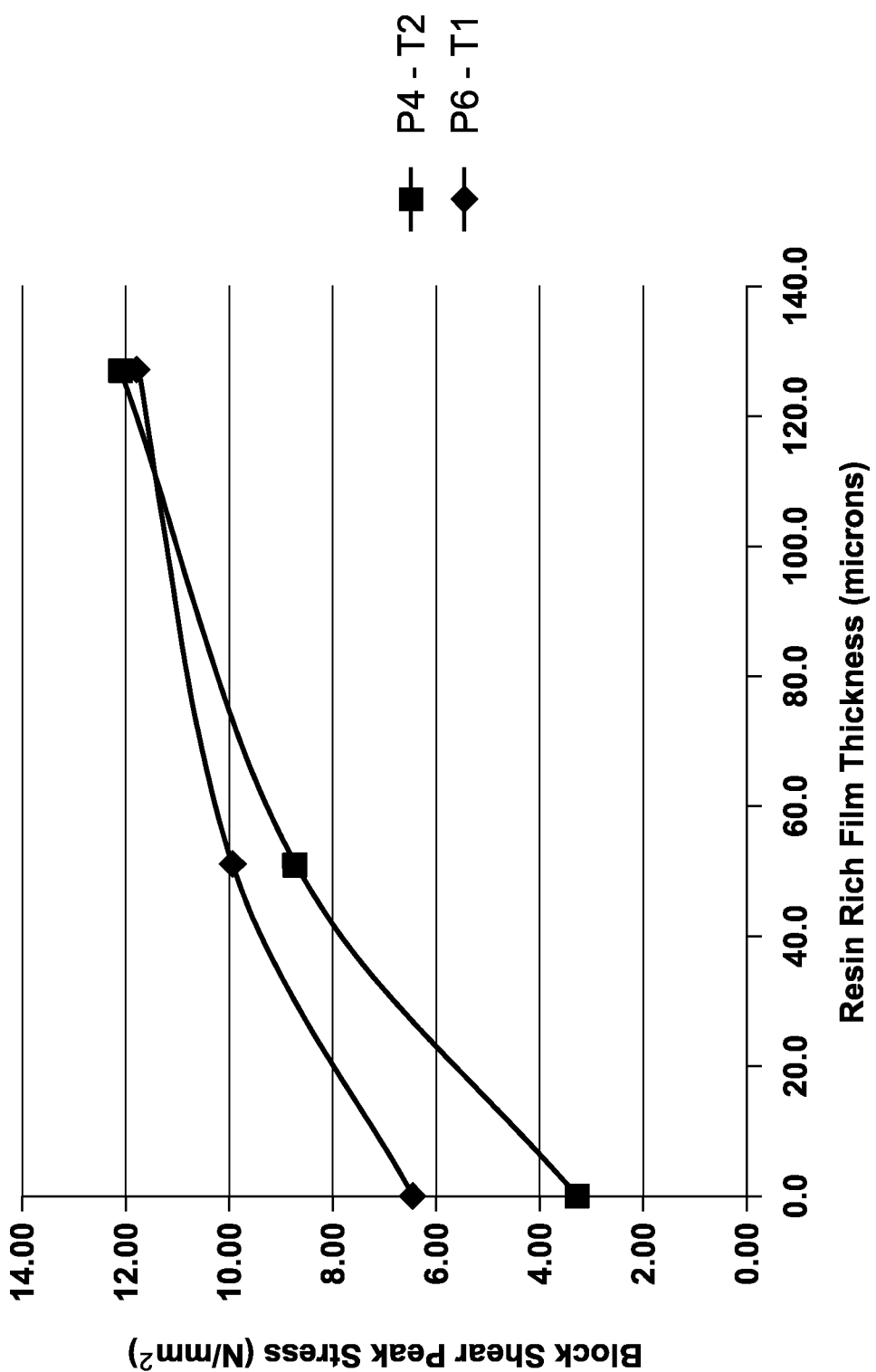
FIG. 9 depicts a graph showing the effects of resin film thickness on the resulting block shear peak stress in reinforced wood materials.

Another discovery was the finding that a thermoplastic polyester-based resin film layer is useful for improving both the bond strength to wood and the peak flexural strength of the reinforced material as shown in Table 10 and FIGS. 8 and 9. The high pressure (1.72 MPa) data shows that incorporation of a polyester resin film layer, containing the same polymer contained in the UDT, between the UDT and wood improved the flexural strength from 33 percent to 53 percent (at 5 minutes of time) and from 45 percent to 53 percent (at 10 minutes of time). Even at low pressure and extended time (0.34 MPa and 10 minutes), the flexural strength improved from 24 percent to 37 percent. Thus, it becomes evident that adding a polyester resin film layer of 51 to 127 µm thick is useful for improving or maximizing the benefits and versatility of the reinforced materials. The data in FIG. 8 shows that a polyester resin film layer enables the UDT to exhibit flexural strength improvements of 50 percent when bonded for 5 minutes and at 1.72 MPa, whereas the absence of a polyester resin layer results in a 45 percent improvement in the flexural strength with 10 minutes of bonding at 1.72 MPa. In these examples, the incorporation of the polyester resin layer doubled the efficiency (by reducing bond time from 10 minutes to 5 minutes) of thermal bonding and improved the flexural strength. When a polyester resin layer is used, one may be able to utilize lower pressures or lower temperatures during thermal bonding to obtain the required bond strength, thereby lessening the maintenance and costs associated with high pressure hydraulic systems.

FIG. 9 further shows the merits and versatility obtained by using a polyester resin film layer. As shown in the plot for two polymers (P4 and P6), the bond strength is significantly increased by incorporating a 51 µm thick film, and even further improved with a 127 µm thick film, in the UDT versus the UDT-only case. This data shows that the bond is stronger when the polyester resin film layer is used with the UDT, thereby resulting in the flexural performance benefits highlighted in FIG. 8. The fact that the bond can be strengthened with a polyester resin layer potentially offers additional benefits to commercial applications, such as better durability during weathering, less delamination during shrink and expansion of wood, as well as higher loads to failure.

Example 10—Moisture Level Analysis

It is well known within the wood industry, such as plywood manufacturing, that individual ply layers must be dried prior to being pressed and glued with adhesives such as phenol resorcinol formaldehyde. One of the reasons for this is that adhesives such as these are often impacted by the moisture level of the wood substrate at the time of bonding, which can cause poor bonds between glue layers and wood materials.

Figure 10:
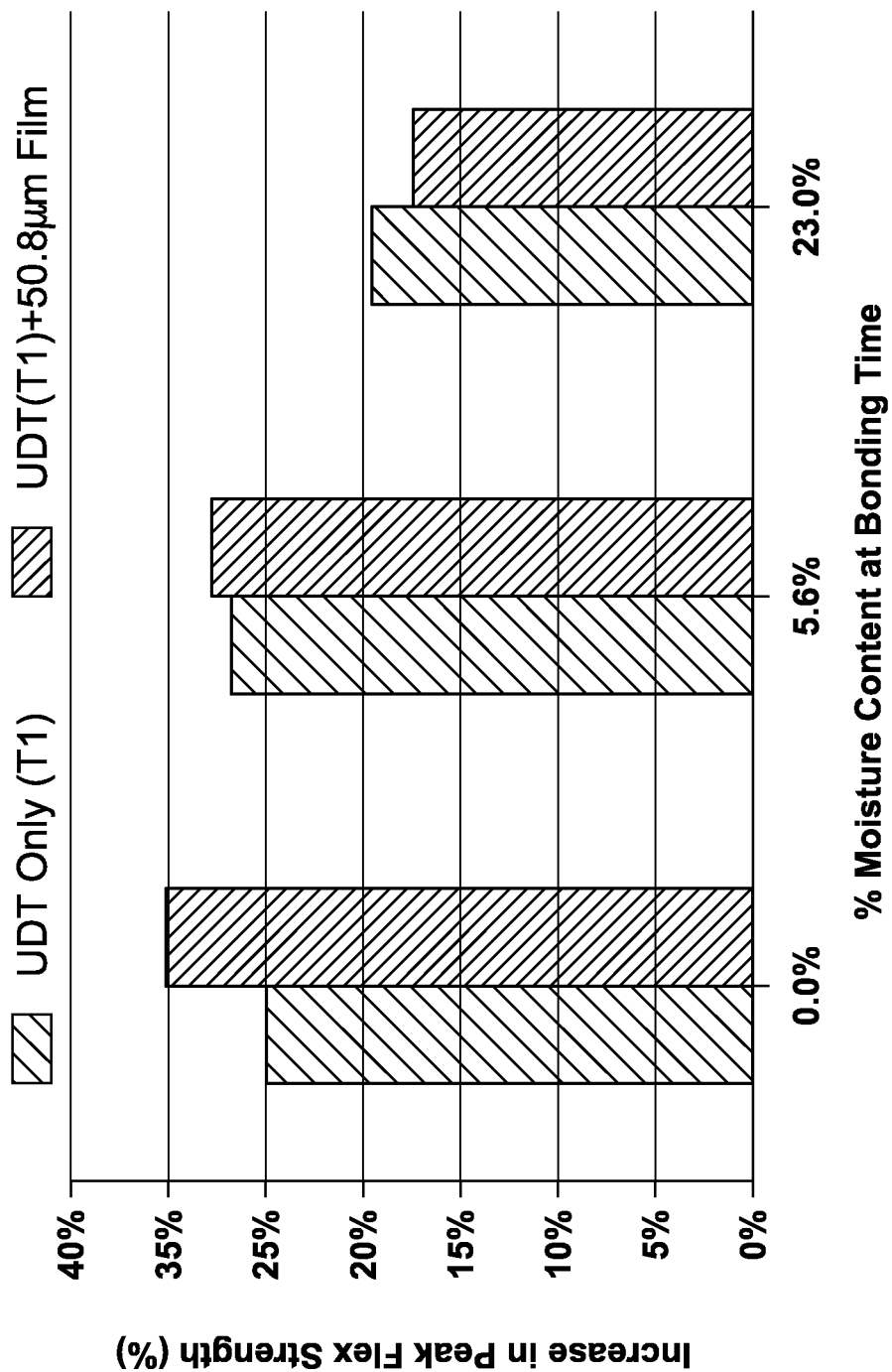
FIG. 10 depicts a graph showing the effects of moisture content in a wood substrate on the resulting peak flexural strength.

For this example, the effect of moisture within the wood at the time of bonding on the ultimate performance of the wood-UDT system was examined. Table 11 and FIG. 10 report the results of this analysis for a UDT (T1) bonded to an oak wood substrate, with and without a resin film layer of P6 having a thickness of 50.8 microns. The UDT was thermally bonded over a 5 minute period using a Carver Press as described above at a temperature of about 145° C. and a pressure of 1.72 MPa, followed by cooling to room temperature under pressure.

The moisture level of the wood was created by exposing the wood directly to water or by drying it entirely in a convection oven (as in the 0.0% moisture case). The moisture level reported in Table 11 was measured just prior to lamination using a Moisture Meter (Wagner MMC 210). In the case of 0.0 percent and 5.6 percent moisture levels, there was no significant change in the ability of the UDT to reinforce wood. When the wood was completely saturated with water to near its maximal capacity, the UDT was still able to significantly reinforce the peak flexural strength of the oak wood. While there is some minor reduction in performance for the high moisture samples (23.0 percent), this data suggests that the bond strength and resulting wood-UDT properties are not strongly dependent upon the moisture level of the wood at the time of thermal bonding. This was considered to be a surprising result in that it should enable the industry to more easily adopt the inventive UDT knowing that moisture may not be a significant variable to control.

TABLE 11

| ID # | Wood Moisture at Bonding Time (%) | Wood | Polymer | Tape | Resin Film of P6 [µm] | Structure | Flexural Strength Test | | |
|---|---|---|---|---|---|---|---|---|---|
| | | | | | | | Flex Strength [MPa] | COV [%] | Flex Increase [%] |
| ML1 | 0.0% | Oak | P6 | Film | 0.0 | WF | 155.7 | 11.9% | 0.0% |
| ML2 | 5.6% | Oak | P6 | Film | 0.0 | WF | 152.8 | 11.9% | 0.0% |
| ML3 | 23.0% | Oak | P6 | Film | 0.0 | WF | 143.8 | 0.2% | 0.0% |
| ML4 | 0.0% | Oak | P6 | T1 | 0.0 | WT | 207.5 | 1.0% | 25.0% |
| ML5 | 5.6% | Oak | P6 | T1 | 0.0 | WT | 209.1 | 23.6% | 26.9% |
| ML6 | 23.0% | Oak | P6 | T1 | 0.0 | WT | 179.1 | — | 19.7% |
| ML7 | 0.0% | Oak | P6 | T1 | 50.8 | WT | 223.0 | 31.4% | 30.2% |
| ML8 | 5.6% | Oak | P6 | T1 | 50.8 | WT | 211.7 | 21.2% | 27.8% |
| ML9 | 23.0% | Oak | P6 | T1 | 50.8 | WT | 174.4 | — | 17.6% |

Example 11—Gloss Analysis

Figure 11:
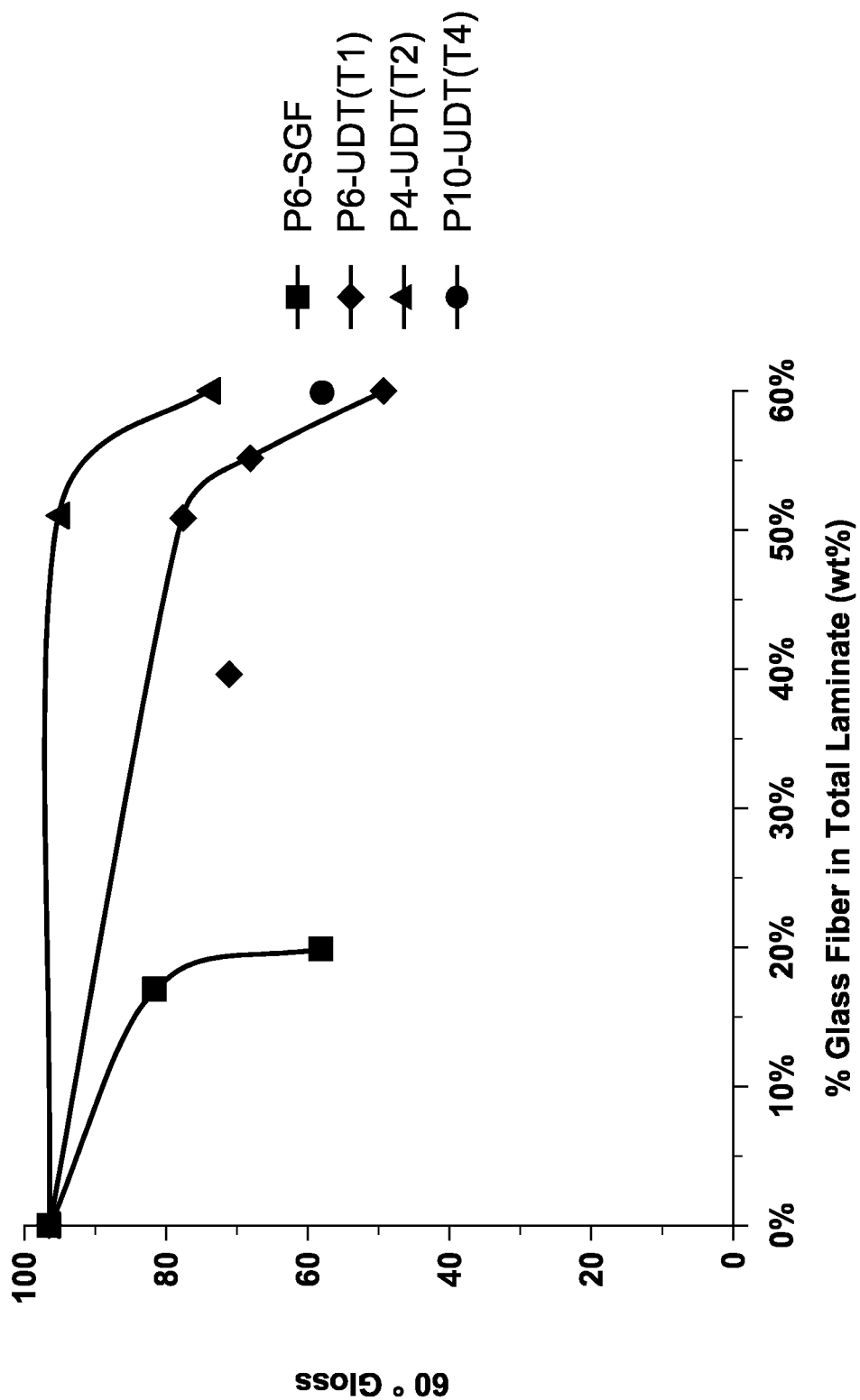
FIG. 11 depicts a graph showing the effects of glass fiber content in the total laminate on the resulting gloss in the reinforced wood materials.

The aesthetic appeal of wood and the ability to see its natural grain pattern is particularly important for many applications such as furniture, paneling, or other wood-based products. As such, being able to reinforce wood while still maintaining a glossy surface and associated contact clarity through which the grain pattern is observable is particularly desirable. Table 12 and FIG. 11 report the 60° gloss measurements on a number of reinforced wood structures, both with the short-glass and UDT systems. The samples for this study were produced using a Carver Press as described above at a temperature of about 145° C. and a pressure of 1.72 MPa for 5 minutes.

The column in Table 12 labeled "% glass fiber in total laminated structure" is calculated by determining the weight percentage of glass in the overall structure, by considering the weight of both the UDT or SGF layer, as well as the resin film (when used). All inventive samples in Table 12 exhibited gloss values from about 50 to about 95. It was somewhat surprising and unexpected that the UDT-based structures containing 40 to 60 percent resin showed gloss values that are better or as good as the short-glass samples, which only contained 20 weight percent or less of glass. Typically, the inclusion of glass in a polymer matrix can create opacity due to a mismatch of the refractive index of glass and polymer or due to the glass creating light scattering objects such as voids or dust particles. However, the polyesters utilized for this study, even P4 (which is opaque black), maintained high gloss values even at greater than 40 weight percent glass loading. As mentioned, this is useful for practical applications as it offers attractive aesthetics and can, in the case of polymers without opaque color additives, enable the wood grain to show through to the observer.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

NUMERICAL RANGES

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

What is claimed is:

1. A reinforced wood-containing material comprising a prepreg composite bonded onto a selected surface of a wood-containing material, wherein said prepreg composite is a unidirectional tape, wherein said prepreg composite comprises at least one thermoplastic polyester and at least

TABLE 12

| ID# | Wood | Polymer ID# | Primary Layer (Film, SGF, or UDT) | Glass in Primary Layer [wt %] | Primary Layer Thickness [μm] | Resin Film Thickness [μm] | Structure | % Glass Fiber in Total Laminate | 60° Gloss |
|---|---|---|---|---|---|---|---|---|---|
| GL1 | Oak | P6 | Film | 0% | 360 | 0.0 | WF | 0% | 96.6 |
| GL2 | Oak | P6 | SGF | 20% | 289 | 50.8 | WFS | 17% | 81.5 |
| GL3 | Oak | P3 | SGF | 20% | 344 | 50.8 | WFS | 18% | 68.0 |
| GL4 | Oak | P6 | SGF | 20% | 289 | 0.0 | WS | 20% | 58.1 |
| GL5 | Oak | P3 | SGF | 20% | 344 | 0.0 | WS | 20% | 71.4 |
| GL6 | Oak | P6 | UDT (T1) | 60% | 272 | 127.0 | WFT | 40% | 71.1 |
| GL7 | Oak | P6 | UDT (T1) | 60% | 272 | 50.8 | WFT | 51% | 77.8 |
| GL8 | Oak | P4 | UDT (T2) | 60% | 274 | 50.8 | WFT | 51% | 95.5 |
| GL9 | Oak | P6 | UDT (T1) | 60% | 549 | 50.8 | WFT | 55% | 68.3 |
| GL10 | Oak | P6 | UDT (T1) | 60% | 272 | 0.0 | WT | 60% | 49.5 |
| GL11 | Oak | P4 | UDT (T2) | 60% | 274 | 0.0 | WT | 60% | 74.1 |
| GL12 | Oak | P4 | UDT (T3) | 60% | 378 | 0.0 | WT | 60% | 69.0 |
| GL13 | Oak | P10 | UDT (T4) | 60% | 306 | 0.0 | WT | 60% | 57.7 |

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

one reinforcing fiber, wherein said polyester is an amorphous polyester having a glass transition temperature of at least 50° C., wherein said thermoplastic polyester comprises a dicarboxylic acid component and a diol component, wherein said diol component comprises diethylene glycol, 2,2,4,4-tetramethyl-1,3-cyclobutanediol, 1,4-cyclohexanedimethanol, neopentyl glycol, or a combination of two or more thereof, and wherein, when said diol component comprises 1,4-cyclohexanedimethanol, said 1,4-cyclohexanedimethanol makes up at least 40 mole percent of said diol component, wherein said polyester has a melt phase viscosity in the range of $10^3$ to $10^7$ Pa-s at 30 to 250° C.

2. A reinforced wood-containing material comprising a prepreg composite bonded onto a selected surface of a wood-containing material, wherein said prepreg composite is a unidirectional tape, wherein said prepreg composite comprises at least one thermoplastic polyester and at least one reinforcing fiber, wherein said polyester has a melt phase viscosity in the range of $10^3$ to $10^7$ Pa-s at 30 to 250° C., wherein said selected surface comprises an external surface on said wood-containing material, wherein the external surface of said reinforced wood-containing material containing said prepreg composite bonded thereon has a gloss of at least 40 gloss units as measured according to ASTM D 2457.

3. A reinforced wood-containing material comprising a prepreg composite bonded onto a selected surface of a wood-containing material, wherein said prepreg composite is a unidirectional tape, wherein said prepreg composite comprises at least one thermoplastic polyester and at least one reinforcing fiber, wherein said polyester has a melt phase viscosity in the range of $10^3$ to $10^7$ Pa-s at 30 to 250° C., wherein said polyester comprises: an acid component comprising at least 50 mole percent of terephthalic acid, isophthalic acid, 1,4-cyclohexane dicarboxylic acid, or a combination of two or more thereof; and a diol component comprising at least 25 mole percent of 2,2,4,4-tetramethyl-1,3-cyclobutanediol, 1,4-cyclohexanedimethanol, diethylene glycol, or a combination of two or more thereof.

4. A reinforced wood-containing material comprising a prepreg composite bonded onto a selected surface of a wood-containing material, wherein said prepreg composite is a unidirectional tape, wherein said prepreg composite comprises at least one thermoplastic polyester and at least one reinforcing fiber, wherein said polyester has a melt phase viscosity in the range of $10^3$ to $10^7$ Pa-s at 30 to 250° C., wherein said polyester comprises: an acid component comprising at least 50 mole percent of terephthalic acid, isophthalic acid, or a combination thereof; and a diol component comprising at least 30 mole percent of 2,2,4,4-tetramethyl-1,3-cyclobutanediol and 1,4-cyclohexanedimethanol.

5. The reinforced wood-containing material of claim 2, 3, or 4, wherein said polyester comprises an amorphous polyester having a glass transition temperature of at least 50° C.

6. A method for preparing a reinforced wood-containing material, said method comprising: applying a prepreg composite directly onto a selected surface of a wood-containing material to thereby form said reinforced wood-containing material; wherein said applying forms a direct bond between said prepreg composite and said selected surface, wherein said bond has an adhesion strength of at least about 2 N/mm$^2$ as measured according to ASTM D905, wherein said prepreg composite is a unidirectional tape, wherein said prepreg composite comprises at least one thermoplastic polyester and at least one reinforcing fiber, and wherein said polyester has a melt phase viscosity in the range of $10^3$ to $10^7$ Pa-s at 30 to 250° C.

7. The method of claim 6, wherein said applying occurs in the absence of an adhesive.

8. The method of claim 6, wherein said applying comprises heating said prepreg composite to temperatures in the range of 30 to 250° C. to form a heated prepreg composite and contacting said heated prepreg with said selected surface under a pressure in the range of 0.25 to 2.0 MPa, wherein the peak flexural strength, according to ASTM D790, of said reinforced material is at least 20 percent greater than the peak flexural strength of the wood-containing material, and wherein said polyester in the form of a neat film is capable of forming a bond with said selected surface of said wood-containing material having an adhesion strength of at least 2 N/mm$^2$ as measured according to ASTM D905.

9. The method of claim 6, wherein said applying comprises contacting said prepreg composite with said selected surface and then heating said prepreg composite and/or said selected surface to a temperature in the range of 30 to 250° C. and under a pressure in the range of 0.25 to 2.0 MPa, wherein the peak flexural strength, according to ASTM D790, of said reinforced material is at least 10 percent greater than the peak flexural strength of the wood-containing material, and wherein said polyester in the form of a neat film is capable of forming a bond with said selected surface of said wood-containing material having an adhesion strength of at least 0.3 N/mm$^2$ as measured according to ASTM D905.

10. The method of claim 6, wherein said applying comprises heating said prepreg composite to temperatures in the range of 30 to 250° C. to form a heated prepreg composite and contacting said heated prepreg with said selected surface under a pressure in the range of 2 to 12 MPa, wherein the peak flexural strength, according to ASTM D790, of said reinforced material is at least 20 percent greater than the peak flexural strength of the wood-containing material, and wherein said polyester in the form of a neat film is capable of forming a bond with said selected surface of said wood-containing material having an adhesion strength of at least 2 N/mm$^2$ as measured according to ASTM D905.

11. The method of claim 6, wherein said applying comprises contacting said prepreg composite with said selected surface and then heating said prepreg composite and/or said selected surface to a temperature in the range of 30 to 250° C. and under a pressure in the range of 2 to 12 MPa, wherein the peak flexural strength, according to ASTM D790, of said reinforced material is at least 10 percent greater than the peak flexural strength of the wood-containing material, and wherein said polyester in the form of a neat film is capable of forming a bond with said selected surface of said wood-containing material having an adhesion strength of at least 0.3 N/mm$^2$ as measured according to ASTM D905.

12. The method of claim 6, further comprising, prior to said applying, adding a resin layer on said selected surface of said wood-containing material to form a prereinforced material, wherein said resin layer comprises at least one thermoplastic polyester.

13. The method of claim 6, wherein said initial wood-containing material comprises at least 90 weight percent of wood, wherein said reinforcing fiber comprises glass, carbon, flax, basalt, comingled fibers, aramid, or a combination of two or more thereof, wherein said bond has an adhesion strength in the range of 2 to 100 N/mm$^2$ as measured according to ASTM D905.

14. The method of claim 6, wherein said polyester comprises: an acid component comprising at least 50 mole percent of terephthalic acid, isophthalic acid, or a combination thereof; and a diol component comprising at least 30 mole percent of 2,2,4,4-tetramethyl-1,3-cyclobutanediol and 1,4-cyclohexanedimethanol.

15. The method of claim 6, wherein said polyester comprises: an acid component comprising at least 50 mole percent of terephthalic acid, isophthalic acid, 1,4-cyclohexane dicarboxylic acid, or a combination of two or more thereof; and a diol component comprising at least 25 mole percent of 2,2,4,4-tetramethyl-1,3-cyclobutanediol, 1,4-cyclohexanedimethanol, diethylene glycol, or a combination of two or more thereof.

16. A unidirectional tape comprising at least one thermoplastic polyester and at least one reinforcing fiber; wherein said thermoplastic polyester comprises a dicarboxylic acid component and a diol component, wherein said diol component comprises diethylene glycol, 2,2,4,4-tetramethyl-1,3-cyclobutanediol, 1,4-cyclohexanedimethanol, neopentyl glycol, or a combination of two or more thereof, wherein, when said diol component comprises said 1,4-cyclohexanedimethanol, said 1,4-cyclohexanedimethanol makes up at least 40 mole percent of said diol component, wherein said thermoplastic polyester has a melt phase viscosity in the range of $10^3$ to $10^7$ Pa-s at 30 to 250° C.

17. The unidirectional tape of claim 16, wherein said polyester is an amorphous polyester having a glass transition temperature of at least 50° C.

18. The unidirectional tape of claim 16, wherein said acid component comprises at least 50 mole percent of terephthalic acid, isophthalic acid, 1,4-cyclohexane dicarboxylic acid, or a combination of two or more thereof, wherein said diol component comprises 2,2,4,4-tetramethyl-1,3-cyclobutanediol, 1,4-cyclohexanedimethanol, diethylene glycol, or a combination of two or more thereof.

19. The unidirectional tape of claim 16, wherein said acid component comprises at least 50 mole percent of terephthalic acid, isophthalic acid, or a combination thereof, wherein said diol component comprises 2,2,4,4-tetramethyl-1,3-cyclobutanediol and 1,4-cyclohexanedimethanol.

20. A reinforced wood-containing material comprising a prepreg composite bonded onto a selected surface of a wood-containing material, wherein said prepreg composite is a unidirectional tape, wherein said prepreg composite comprises at least one thermoplastic polyester and at least one reinforcing fiber, wherein said polyester has a melt phase viscosity in the range of $10^3$ to $10^7$ Pa-s at 30 to 250° C., wherein said polyester comprises: an acid component comprising at least 50 mole percent of terephthalic acid, isophthalic acid, 1,4-cyclohexane dicarboxylic acid, or a combination of two or more thereof; and a diol component comprising at least 25 mole percent of 2,2,4,4-tetramethyl-1,3-cyclobutanediol, 1,4-cyclohexanedimethanol, diethylene glycol, or a combination of two or more thereof, and wherein said selected surface comprises an external surface on said wood-containing material, wherein the external surface of said reinforced wood-containing material containing said prepreg composite bonded thereon has a gloss of at least 70 gloss units as measured according to ASTM D 2457, and wherein said polyester comprises an amorphous polyester having a glass transition temperature of at least 50° C.

21. A reinforced wood-containing material comprising a prepreg composite bonded onto a selected surface of a wood-containing material, wherein said prepreg composite is a unidirectional tape, wherein said prepreg composite comprises at least one thermoplastic polyester and at least one reinforcing fiber, wherein said polyester has a melt phase viscosity in the range of $10^3$ to $10^7$ Pa-s at 30 to 250° C., wherein said polyester comprises: an acid component comprising at least 50 mole percent of terephthalic acid, isophthalic acid, 1,4-cyclohexane dicarboxylic acid, or a combination of two or more thereof; and a diol component comprising at least 25 mole percent of 2,2,4,4-tetramethyl-1,3-cyclobutanediol, 1,4-cyclohexanedimethanol, diethylene glycol, or a combination of two or more thereof, and wherein said selected surface comprises an external surface on said wood-containing material, wherein the external surface of said reinforced wood-containing material containing said prepreg composite bonded thereon has a gloss of 50 to 95 gloss units as measured according to ASTM D 2457, and wherein said polyester comprises an amorphous polyester having a glass transition temperature of at least 50° C.

22. The reinforced wood-containing material of claim 1, 2, 3, 4, 20, or 21, wherein said polyester has a melt phase viscosity in the range of $10^3$ to $10^6$ Pa-s at 30 to 250° C.

23. The reinforced wood-containing material of claim 1, 2, 3, 4, 20, or 21, wherein said wood-containing material comprises at least 90 weight percent of wood, wherein said reinforcing fiber comprises glass, carbon, flax, basalt, comingled fibers, aramid, or a combination of two or more thereof, and wherein said reinforced wood-containing material comprises no adhesive between said prepreg composite and said selected surface.

24. The reinforced wood-containing material of claim 1, 2, 3, 4, 20, or 21, further comprising a resin layer between said prepreg composite and said selected surface, wherein said resin layer comprises at least one thermoplastic polyester.

* * * * *